US010452474B2

(12) United States Patent
Lin et al.

(10) Patent No.: US 10,452,474 B2
(45) Date of Patent: Oct. 22, 2019

(54) NAND FLASH MEMORY DEVICE

(71) Applicant: Toshiba Memory Corporation, Minato-ku (JP)

(72) Inventors: Wangying Lin, Yokohama (JP); Shunsuke Kodera, Yokohama (JP)

(73) Assignee: Toshiba Memory Corporation, Minato-ku (JP)

( * ) Notice: Subject to any disclaimer, the term of this patent is extended or adjusted under 35 U.S.C. 154(b) by 172 days.

(21) Appl. No.: 15/698,821

(22) Filed: Sep. 8, 2017

(65) Prior Publication Data

US 2018/0276070 A1   Sep. 27, 2018

(30) Foreign Application Priority Data

Mar. 21, 2017 (JP) ................................. 2017-054739

(51) Int. Cl.
*G11C 29/00* (2006.01)
*G06F 11/10* (2006.01)
*G06F 3/06* (2006.01)

(52) U.S. Cl.
CPC ........ *G06F 11/1068* (2013.01); *G06F 3/0619* (2013.01); *G06F 3/0655* (2013.01); *G06F 3/0679* (2013.01); *G06F 11/1048* (2013.01)

(58) Field of Classification Search
CPC combination set(s) only.
See application file for complete search history.

(56) References Cited

U.S. PATENT DOCUMENTS

2008/0201553 A1* 8/2008 Kawamoto ......... G06F 12/0246
                                                        711/206
2008/0288814 A1* 11/2008 Kitahara ............... G06F 11/073
                                                        714/5.1
2009/0055680 A1   2/2009 Honda et al.
(Continued)

FOREIGN PATENT DOCUMENTS

JP          4950886        6/2012
JP       2013-122793       6/2013
(Continued)

OTHER PUBLICATIONS

"Toshiba MOS Digital Integrated Circuit Silicon Gate CMOS", 1G BIT (128M X 8 BIT) CMOS NAND, E2PROM; Toshiba Datasheet (TC58NVG0S3HTA00), Aug. 2012, 51 pages.
(Continued)

*Primary Examiner* — Guerrier Merant
(74) *Attorney, Agent, or Firm* — Oblon, McClelland, Maier & Neustadt, L.L.P.

(57) ABSTRACT

According to an embodiment, a semiconductor storage device includes a detection circuit configured to detect an error in data read from a first memory cell array. The read data of a size corresponding to a page unit is subjected to detection of an error for each of a plurality of first units into which the page unit is divided. When performing a first operation of concurrently executing outputting of first data read from the first memory cell array to an outside and reading of second data different from the first data from the first memory array, an interface circuit is configured to output information based on the error detected with respect to the first data to the outside.

10 Claims, 30 Drawing Sheets

(56) References Cited

U.S. PATENT DOCUMENTS

| | | | |
|---|---|---|---|
| 2012/0072806 A1* | 3/2012 | Tabata | G06F 11/1048 |
| | | | 714/773 |
| 2012/0284453 A1* | 11/2012 | Hashimoto | G06F 3/0616 |
| | | | 711/103 |
| 2013/0148435 A1 | 6/2013 | Matsunaga | |
| 2013/0159785 A1* | 6/2013 | Hashimoto | G06F 11/004 |
| | | | 714/47.2 |
| 2013/0173991 A1* | 7/2013 | Ware | G11C 7/1006 |
| | | | 714/763 |
| 2014/0237319 A1* | 8/2014 | Seo | G06F 11/1048 |
| | | | 714/764 |
| 2014/0289559 A1* | 9/2014 | Hashimoto | G11C 29/08 |
| | | | 714/27 |
| 2016/0034206 A1* | 2/2016 | Ryan | G11C 16/349 |
| | | | 711/103 |
| 2016/0162355 A1* | 6/2016 | Mizrachi | G06F 11/1048 |
| | | | 714/57 |
| 2017/0060676 A1 | 3/2017 | Kodera et al. | |

FOREIGN PATENT DOCUMENTS

| | | |
|---|---|---|
| JP | 2014-137833 | 7/2014 |
| JP | 2017-045420 | 3/2017 |
| WO | WO 2008/027759 A1 | 3/2008 |

OTHER PUBLICATIONS

"Toshiba MOS Digital Integrated Circuit Silicon Gate CMOS", 1G BIT (128M X 8 BIT) CMOS NAND, E2PROM; Toshiba Datasheet (TC58BVG0S3HTA00), Aug. 2012, 44 pages.

* cited by examiner

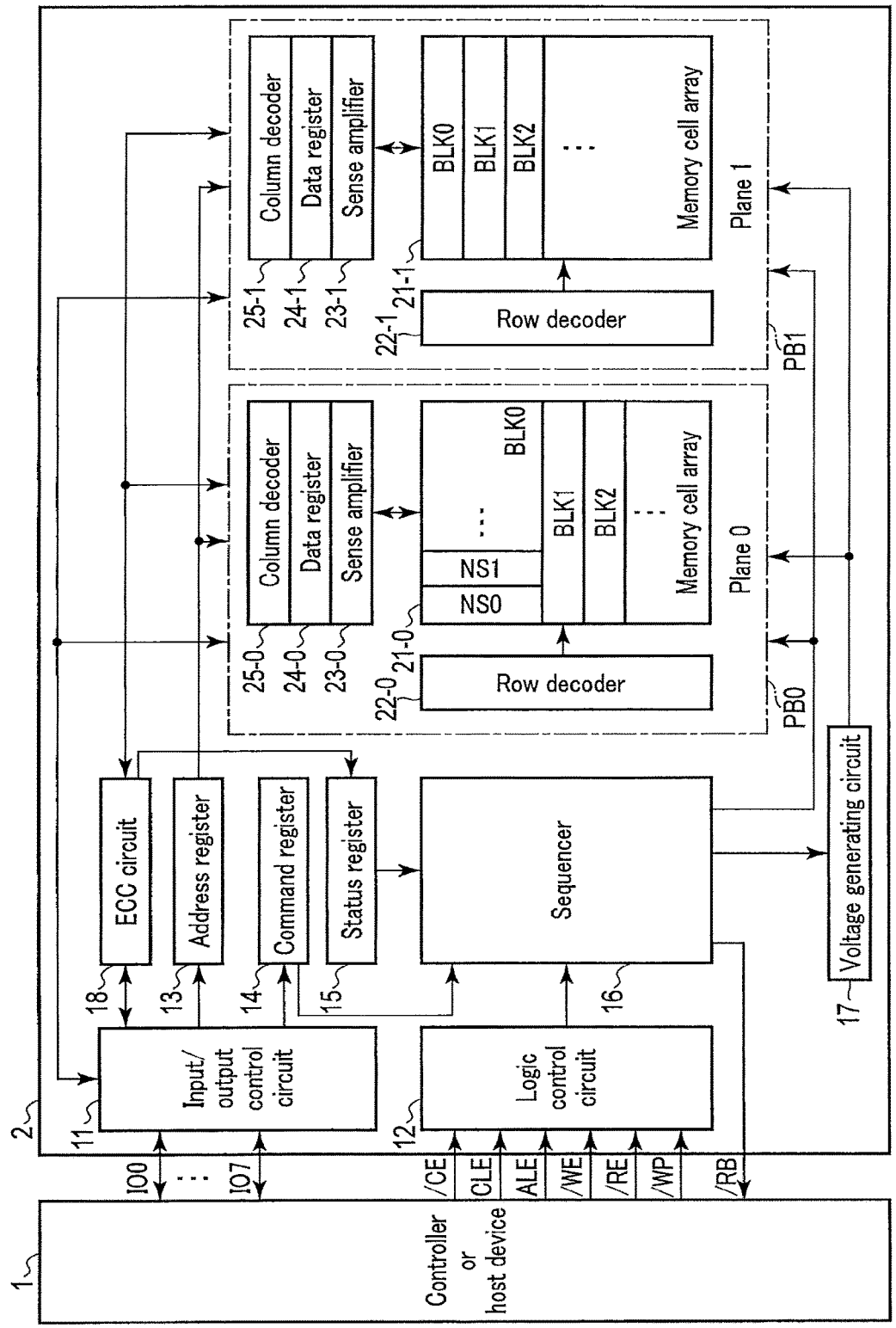
F I G. 1

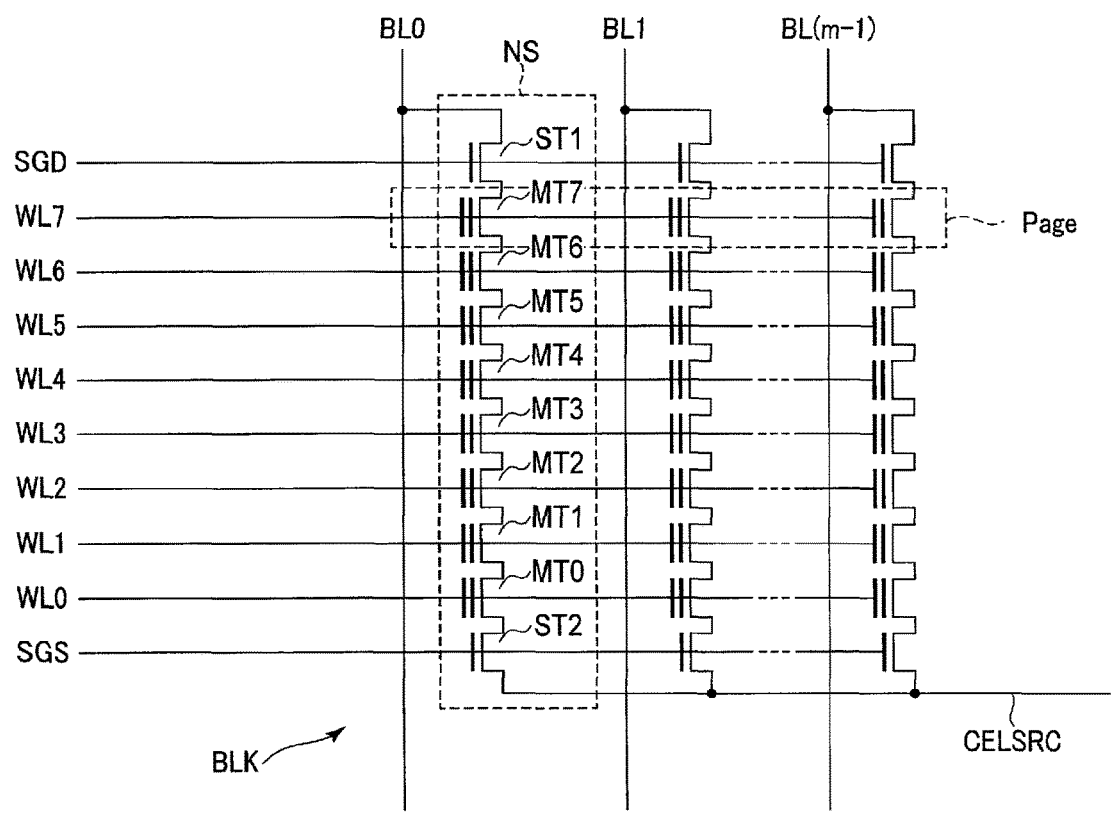
F I G. 2

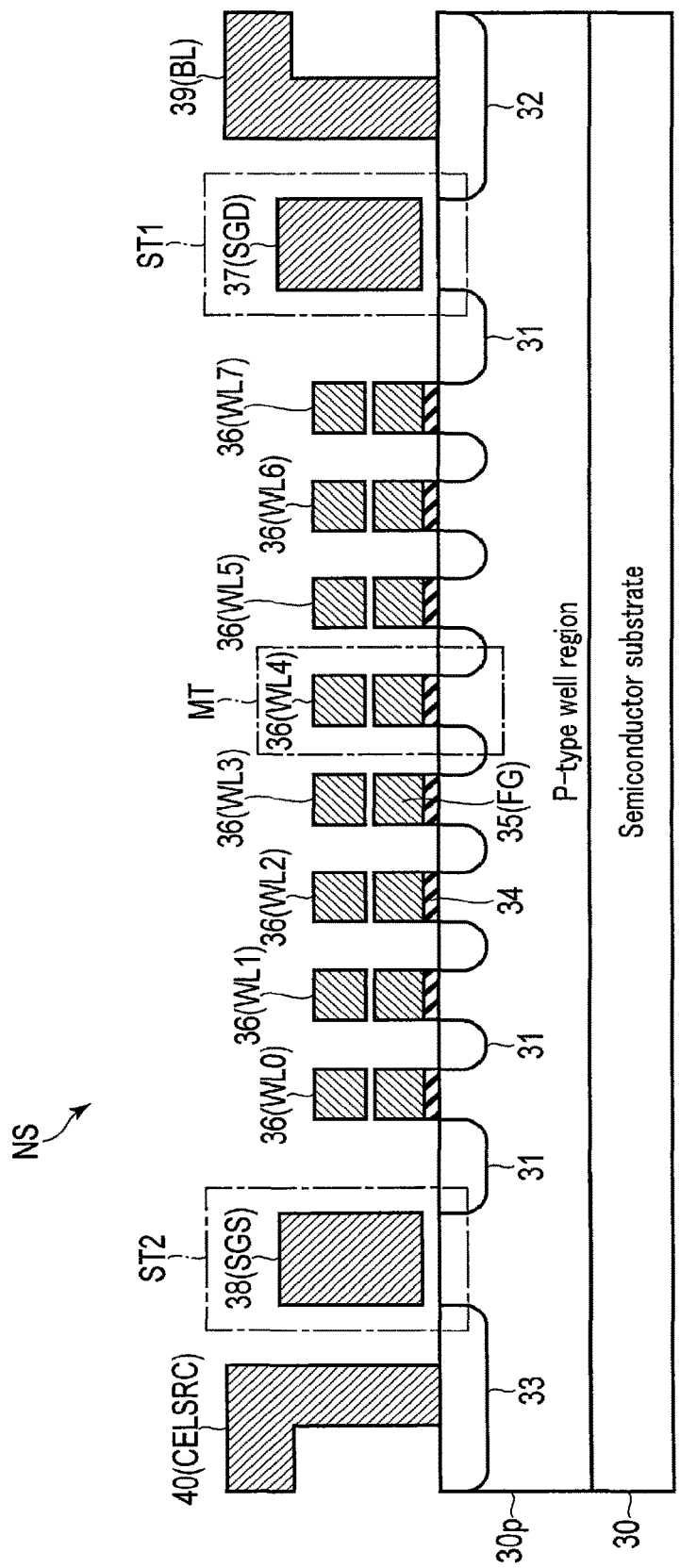
F I G. 3

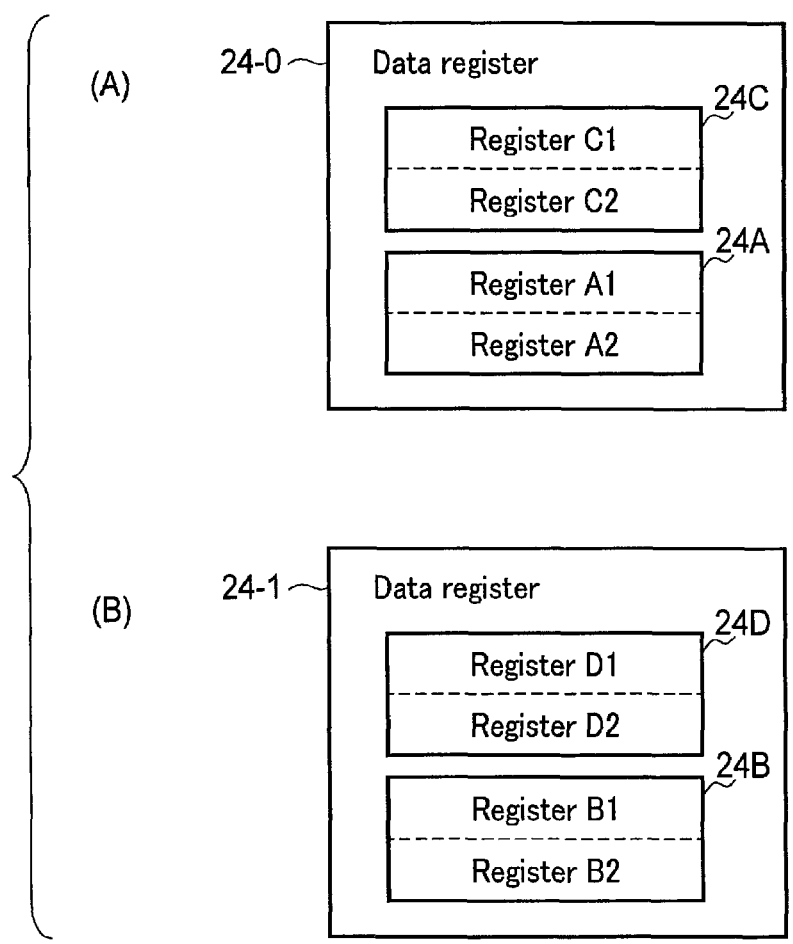
F I G. 4

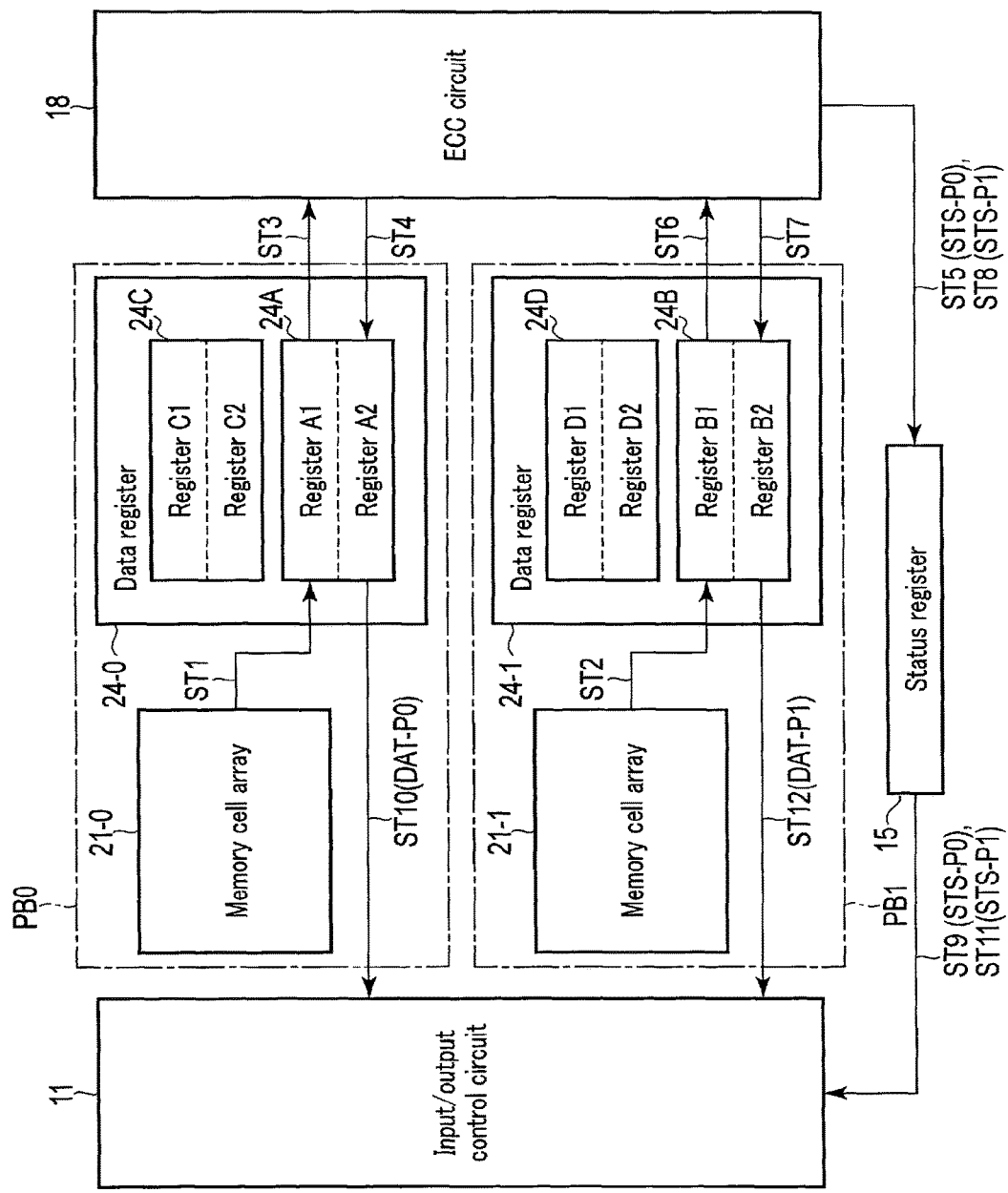
F I G. 6

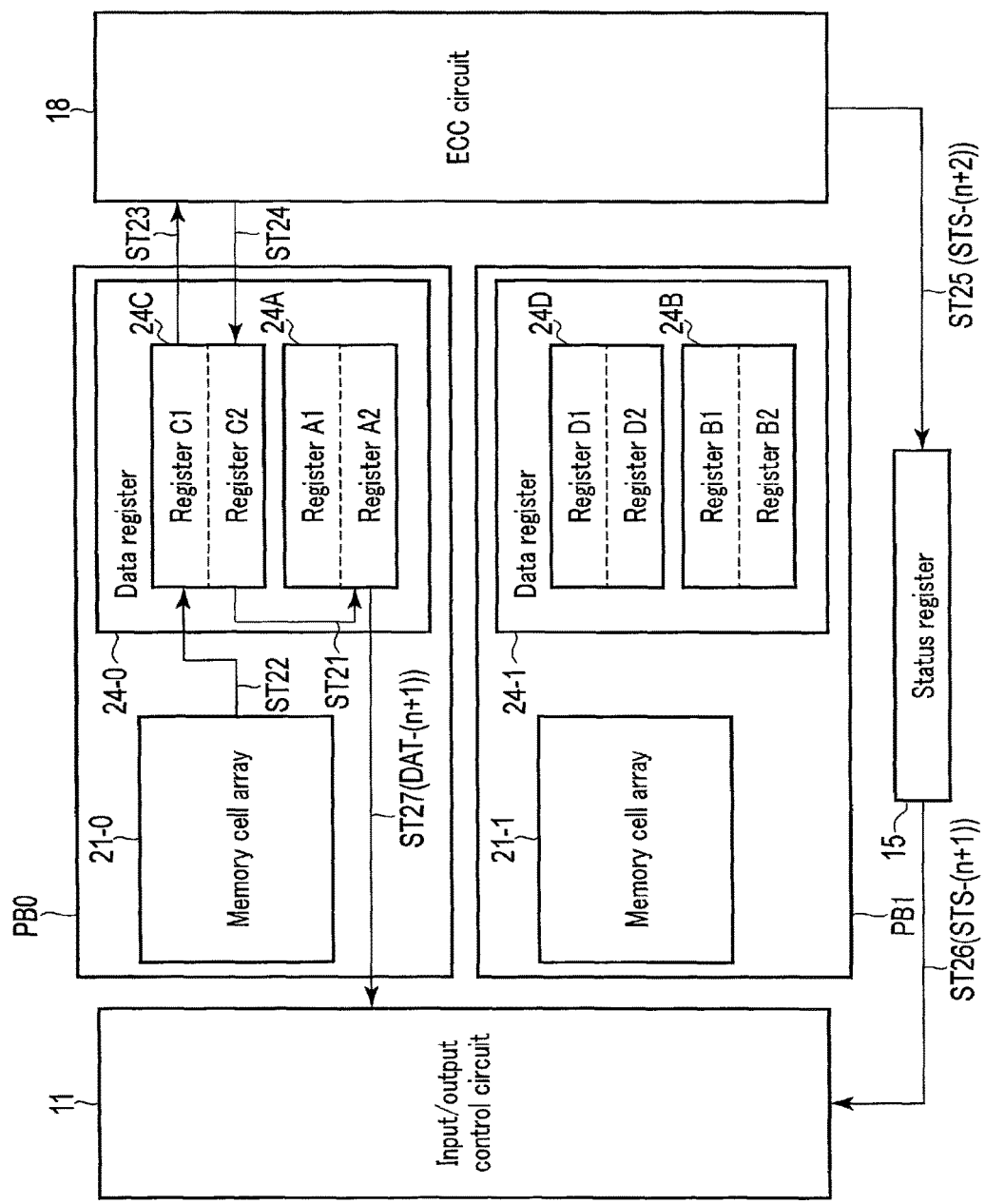
F I G. 8

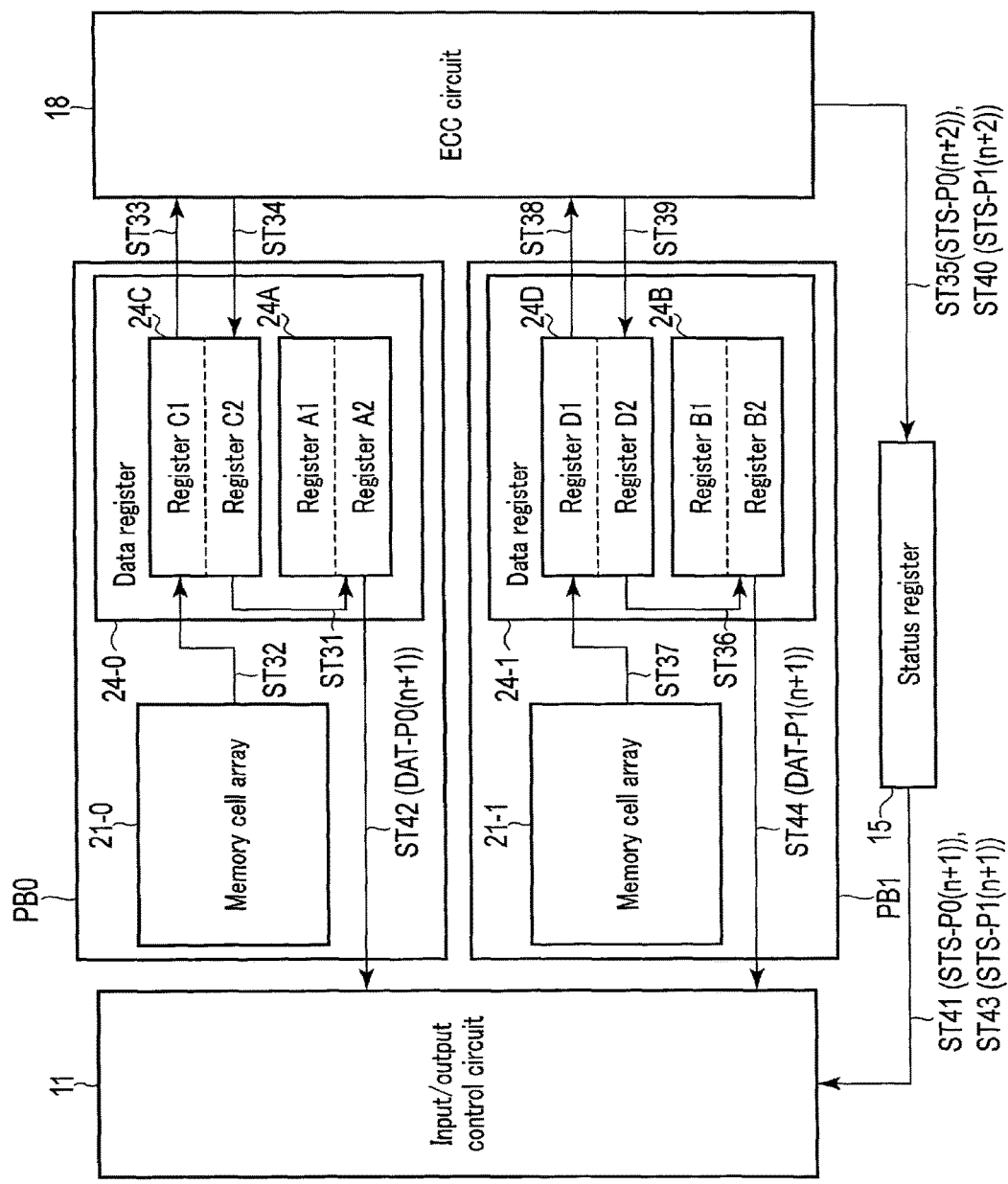
F I G. 10

| Address | Bit 7 | Bit 6 | Bit 5 | Bit 4 | Bit 3 | Bit 2 | Bit 1 | Bit 0 |
|---|---|---|---|---|---|---|---|---|
| A0h | BFA_3 | BFA_2 | BFA_1 | BFA_0 | SA_3 | SA_2 | SA_1 | SA_0 |
| B0h | BFB_3 | BFB_2 | BFB_1 | BFB_0 | SB_3 | SB_2 | SB_1 | SB_0 |

FIG. 13

| Address | Bit 7 | Bit 6 | Bit 5 | Bit 4 | Bit 3 | Bit 2 | Bit 1 | Bit 0 |
|---|---|---|---|---|---|---|---|---|
| C0h | BFC_3 | BFC_2 | BFC_1 | BFC_0 | SC_3 | SC_2 | SC_1 | SC_0 |
| D0h | BFD_3 | BFD_2 | BFD_1 | BFD_0 | SD_3 | SD_2 | SD_1 | SD_0 |

F I G. 15

| Address | Bit 7 | Bit 6 | Bit 5 | Bit 4 | Bit 3 | Bit 2 | Bit 1 | Bit 0 |
|---|---|---|---|---|---|---|---|---|
| 10h | BF1_3 | BF1_2 | BF1_1 | BF1_0 | S1_3 | S1_2 | S1_1 | S1_0 |
| 20h | BF2_3 | BF2_2 | BF2_1 | BF2_0 | S2_3 | S2_2 | S2_1 | S2_0 |
| 30h | BF3_3 | BF3_2 | BF3_1 | BF3_0 | S3_3 | S3_2 | S3_1 | S3_0 |
| 40h | BF4_3 | BF4_2 | BF4_1 | BF4_0 | S4_3 | S4_2 | S4_1 | S4_0 |

F I G. 17

| Address | Bit 7 | Bit 6 | Bit 5 | Bit 4 | Bit 3 | Bit 2 | Bit 1 | Bit 0 |
|---|---|---|---|---|---|---|---|---|
| A0h | BFA0_3 | BFA0_2 | BFA0_1 | BFA0_0 | 0 | | reserved | |
| A1h | BFA1_3 | BFA1_2 | BFA1_1 | BFA1_0 | 0 | | reserved | |
| A2h | BFA2_3 | BFA2_2 | BFA2_1 | BFA2_0 | 0 | | reserved | |
| A3h | BFA3_3 | BFA3_2 | BFA3_1 | BFA3_0 | 0 | | reserved | |
| B0h | BFB0_3 | BFB0_2 | BFB0_1 | BFB0_0 | 1 | | reserved | |
| B1h | BFB1_3 | BFB1_2 | BFB1_1 | BFB1_0 | 1 | | reserved | |
| B2h | BFB2_3 | BFB2_2 | BFB2_1 | BFB2_0 | 1 | | reserved | |
| B3h | BFB3_3 | BFB3_2 | BFB3_1 | BFB3_0 | 1 | | reserved | |
| C0h | BFC0_3 | BFC0_2 | BFC0_1 | BFC0_0 | 0 | | reserved | |
| C1h | BFC1_3 | BFC1_2 | BFC1_1 | BFC1_0 | 0 | | reserved | |
| C2h | BFC2_3 | BFC2_2 | BFC2_1 | BFC2_0 | 0 | | reserved | |
| C3h | BFC3_3 | BFC3_2 | BFC3_1 | BFC3_0 | 0 | | reserved | |
| D0h | BFD0_3 | BFD0_2 | BFD0_1 | BFD0_0 | 1 | | reserved | |
| D1h | BFD1_3 | BFD1_2 | BFD1_1 | BFD1_0 | 1 | | reserved | |
| D2h | BFD2_3 | BFD2_2 | BFD2_1 | BFD2_0 | 1 | | reserved | |
| D3h | BFD3_3 | BFD3_2 | BFD3_1 | BFD3_0 | 1 | | reserved | |

F I G. 20

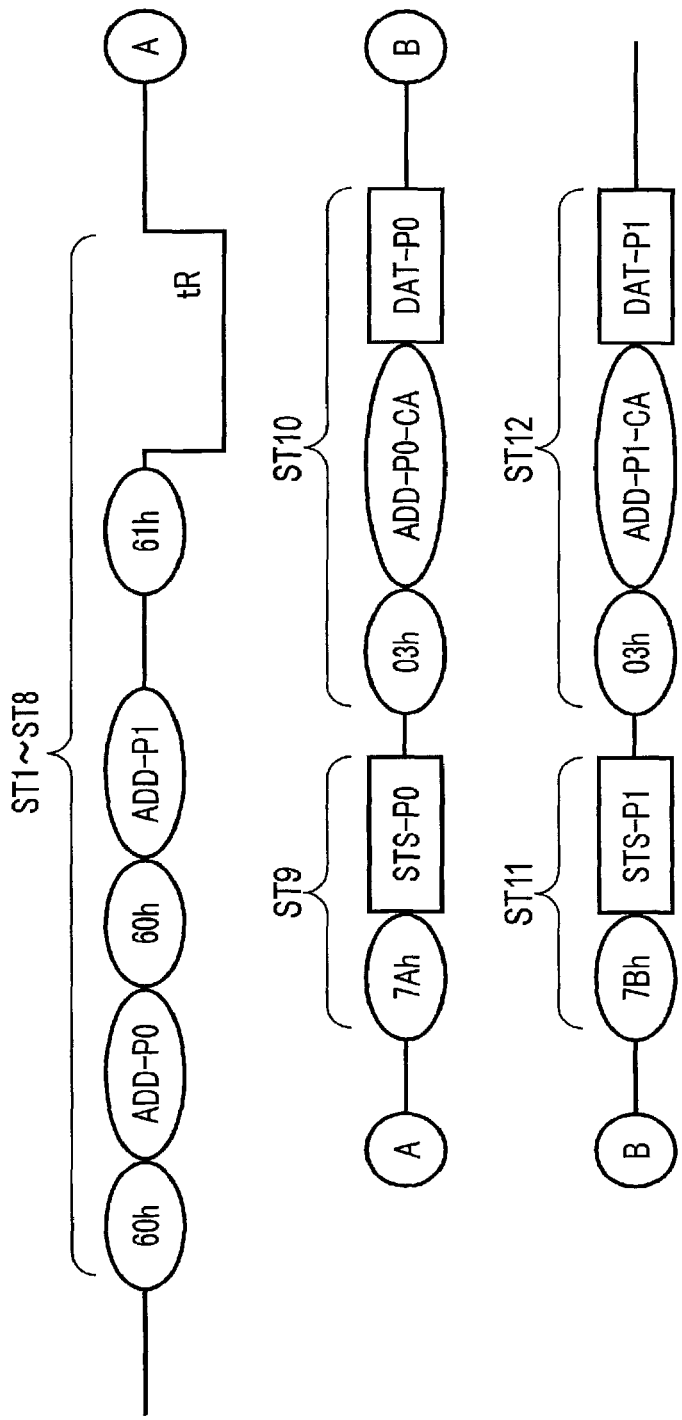
F I G. 23

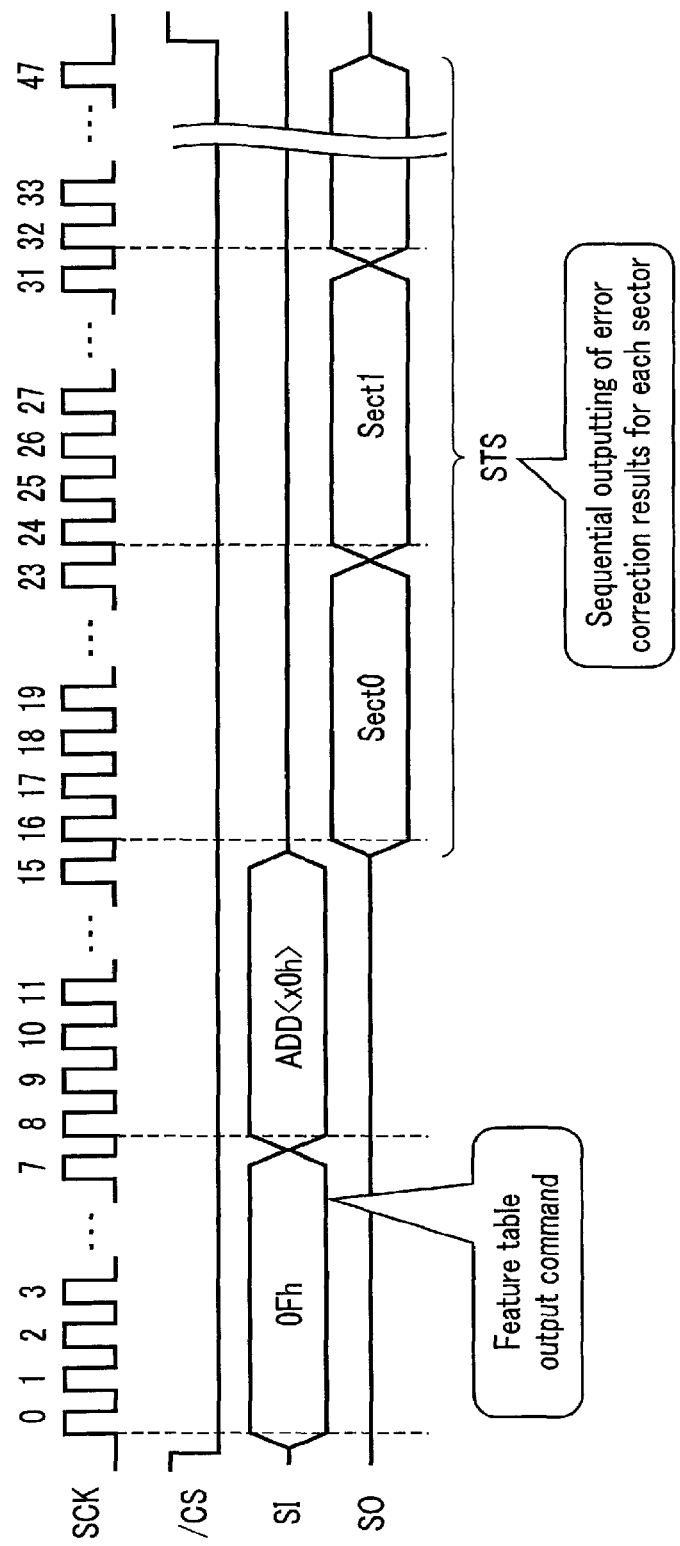
F I G. 26

NAND FLASH MEMORY DEVICE

CROSS-REFERENCE TO RELATED APPLICATIONS

This application is based upon and claims the benefit of priority from Japanese Patent Application No. 2017-054739, filed Mar. 21, 2017, the entire contents of which are incorporated herein by reference.

FIELD

Embodiments described herein relate generally to a semiconductor storage device.

BACKGROUND

A NAND flash memories as a semiconductor storage device is known.

BRIEF DESCRIPTION OF THE DRAWINGS

FIG. 1 is a block diagram for describing the configuration of a semiconductor storage device according to a first embodiment;

FIG. 2 is a circuit diagram for describing the configuration of a memory cell array of the semiconductor storage device according to the first embodiment;

FIG. 3 is a cross-sectional view for describing the configuration of the memory cell array of the semiconductor storage device according to the first embodiment;

FIG. 4 is a block diagram for describing the configuration of a data register of the semiconductor storage device according to the first embodiment;

FIG. 6 is a block diagram for describing the multi-plane reading operation of the semiconductor storage device according to the first embodiment;

FIG. 8 is a block diagram for describing the cache reading operation of the semiconductor storage device according to the first embodiment;

FIG. 10 is a block diagram for describing the multi-plane reading operation with data cache of the semiconductor storage device according to the first embodiment;

FIG. 13 is a feature table used for the multi-plane reading operation of the semiconductor storage device according to the first modification of the first embodiment;

FIG. 15 is a feature table used for the cache reading operation of the semiconductor storage device according to the first modification of the first embodiment;

FIG. 17 is a feature table used for the multi-plane reading operation with data cache of the semiconductor storage device according to the first modification of the first embodiment;

FIG. 20 is a feature table used for the reading operation of the semiconductor storage device according to the second modification of the first embodiment;

FIG. 23 is a command sequence for describing the multi-plane reading operation of the semiconductor storage device according to the second embodiment;

FIG. 26 is a command sequence for describing the error correction result output operation of the semiconductor storage device according to a first modification of the second embodiment;

DETAILED DESCRIPTION

Figure 5:
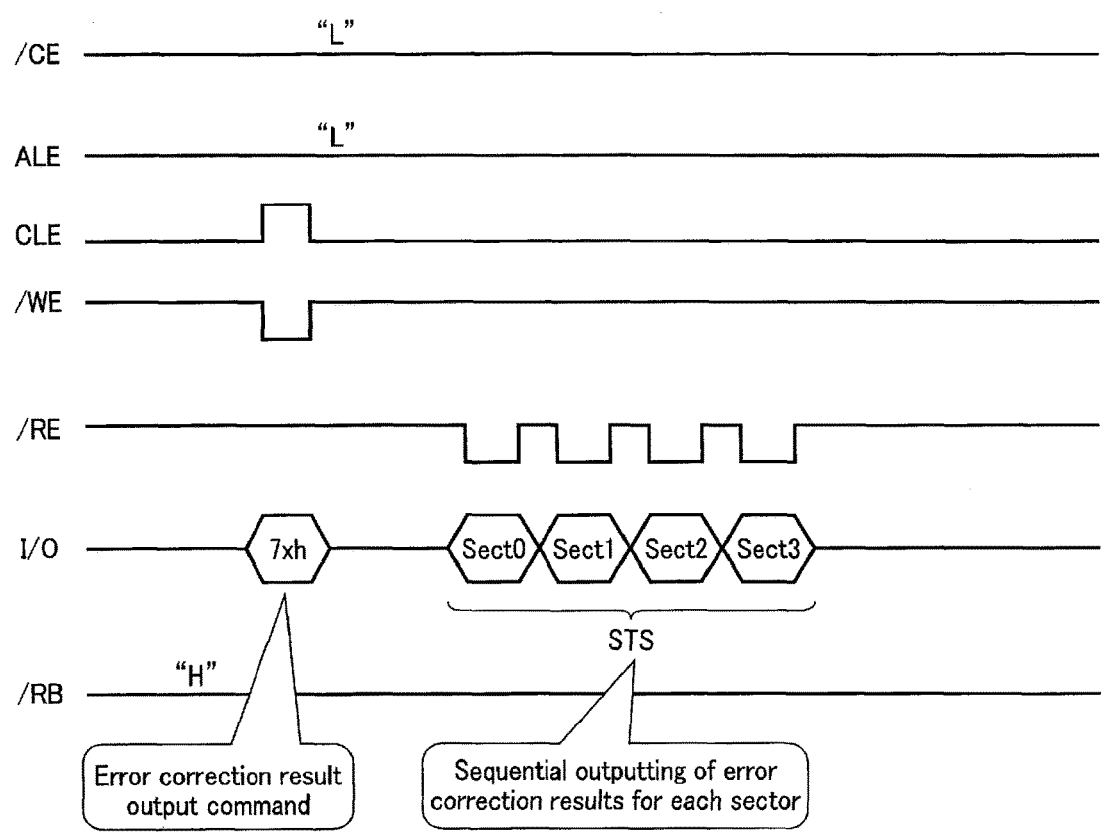
FIG. 5 is a command sequence for describing the error correction result output operation of the semiconductor storage device according to the first embodiment.

In general, according to one embodiment, a semiconductor storage device includes an interface circuit configured to communicate with an outside, a first memory cell array which includes a memory cell transistor configured to hold data and from which data is read for each page unit, and a detection circuit configured to detect an error in data read from the first memory cell array. The read data of a size corresponding to the page unit is subjected to detection of an error for each of a plurality of first units into which the page unit is divided. When performing a first operation of concurrently executing outputting of first data read from the first memory cell array to the outside and reading of second data different from the first data from the first memory array, the interface circuit is configured to output information based on the error detected with respect to the first data to the outside.

Embodiments will be described below with reference to the accompanying drawings. Note that in the following description, common reference numerals denote components having the same functions and configurations. To discriminate between a plurality of components having a common reference numeral, subscripts are added to the common reference numeral. Note that if it is not necessary to specifically discriminate between the plurality of components, the common reference numeral without any subscripts denotes the plurality of components.

In addition, to "concurrently" execute two operations in the following description includes a period during which the two operations are redundantly executed.

1. First Embodiment

A semiconductor storage device according to the first embodiment will be described.
1.1 Configuration
The configuration of the semiconductor storage device according to the first embodiment will be described first.
1.1.1 Configuration of Semiconductor Storage Device An example of the configuration of the semiconductor storage device according to the first embodiment will be described with reference to FIG. 1.

As shown in FIG. 1, a semiconductor storage device 2 is, for example, a NAND flash memory, which is connected to an external controller or a host device 1 (to be simply referred to as the controller 1 hereinafter in the first embodiment).

The semiconductor storage device 2 includes a plurality of planes PB, i.e., PB0 and PB1, an input/output control circuit 11, a logic control circuit 12, an address register 13, a command register 14, a status register 15, a sequencer 16, a voltage generating circuit 17, and an ECC circuit 18. The planes PB0 and PB1 respectively include memory cell arrays 21, i.e., 21-0 and 21-1, row decoders 22, i.e., 22-0 and 22-1, sense amplifiers 23, i.e., 23-0 and 23-1, registers 24, i.e., 24-0 and 24-1, and column decoders 25, i.e., 25-0 and 25-1.

Each memory cell array 21 includes a plurality of blocks BLK, i.e., BLK0, BLK1, BLK2, . . . . Each block BLK is assigned with an address for identifying the corresponding block BLK belonging to a specific plane PB. Each block BLK is, for example, a unit of data erasure. That is, the data in the same block BLK are collectively erased. Each block BLK includes a plurality of NAND strings NS, i.e., NS0, NS1, . . . . Each NAND string NS includes a plurality of memory cell transistors (not shown) each associated with a row and a column. Note that the number of blocks in the memory cell array 21 and the number of NAND strings in one block BLK can be set to arbitrary numbers.

The memory cell transistors on the same row are connected to the same word line, and the memory cell transistors on the same column are connected to the same bit line. Data are collectively read and written in the plurality of memory cell transistors connected to the same word line. This unit of data is called a "page". Data corresponding to one page includes, for example, net data and management data. Net data is managed in units called "sectors". One page includes, for example, four sectors. Management data includes ECC data (parity) for error correction. Error correction is performed for each sector.

The input/output control circuit 11 transmits and receives signals IO, i.e., IO0 to IO7, to and from the controller 1. The signal IO is, for example, an 8-bit signal. The signal IO is the entity of the data transmitted and received between the semiconductor storage device 2 and the controller 1, and includes an address, command, and data. Data includes, for example, write data and read data. The input/output control circuit 11 respectively transfers the command and address in the signal IO to the address register 13 and the command register 14. In addition, the input/output control circuit 11 transmits and receives write data and read data to and from the ECC circuit 18 and the data register 24.

The logic control circuit 12 receives signals /CE, CLE, ALE, /WE, /RE, and /WP from the controller 1. The signal /CE is a chip enable signal for enabling the semiconductor storage device 2. The signal CLE is a command latch enable signal that notifies the semiconductor storage device 2 that the signal IO flowing in the semiconductor storage device 2 while the signal CLE is at "H (High)" level is a command. The signal ALE is an address latch enable signal that notifies the semiconductor storage device 2 that the signal IO flowing in the semiconductor storage device 2 while the signal ALE is at "H" level is an address. In addition, the signals CLE and ALE notify the semiconductor storage device 2 that the signal IO flowing in the semiconductor storage device 2 while both the signals CLE and ALE are at "L (Low)" level is data. The signal /WE is a write enable signal that instructs the semiconductor storage device 2 to receive the signal IO flowing in the semiconductor storage device 2 while the signal /WE is at "L" level. The signal /RE is a read enable signal that instructs the semiconductor storage device 2 to output the signal IO. The signal /WP is a write protect signal that instructs the semiconductor storage device 2 to inhibit data write and erasure.

The address register 13 receives the signal IO recognized as an address from the input/output control circuit 11 and temporarily holds the signal. The address register 13 transfers, for example, the held address to the row decoder 22 and the sense amplifier 23.

The command register 14 receives the signal IO recognized as a command from the input/output control circuit 11 and temporarily holds the signal. The command register 14 transfers the held command to the sequencer 16.

The status register 15 holds various types of status information in the semiconductor storage device 2. Status information includes, for example, the error correction result generated by the ECC circuit 18 at the time of a reading operation. Note that the status register 15 is preferably configured to simultaneously hold a plurality of (for example, four) error correction results so as to be compatible with various types of reading schemes.

The sequencer 16 receives a command from the command register 14 and controls the overall semiconductor storage device 2 in accordance with the sequence based on the received command. The sequencer 16 also notifies the outside of the state of the semiconductor storage device 2 by transferring the signal /RB to the controller 1. The signal /RB is a ready-busy signal indicating whether the semiconductor storage device 2 is in a ready state (in which an instruction is received from the outside) or a busy state (in which no instruction is received from the outside).

The voltage generating circuit 17 generates voltages required for operations, such as data write, read, and erasure, based on instructions from the sequencer 16. The voltage generating circuit 17 supplies generated voltages to the memory cell array 21, the row decoder 22, and the sense amplifier 23.

The ECC circuit 18 performs error detection processing and error correction processing. More specifically, the ECC circuit 18 generates a parity for each sector based on the data received from the controller 1 at the time of the writing of data, and transfers the parity and net data corresponding to the parity to the data register 24. At the time of the reading of data, the ECC circuit 18 generates a syndrome for each sector based on the parity included in the data transferred from the data register 24, and detects the presence/absence of an error. Upon detecting an error, the ECC circuit 18 corrects the error by specifying its bit position, and generates post-error correction data. The ECC circuit 18 transfers the generated post-error correction data to, for example, the data register 24. The ECC circuit 18 also generates an error correction result as a result of error correction processing, and transfers it to the status register 15. An error correction result includes, for example, a sector position, error bit count, and correction success/failure information. A sector position includes, for example, information for identifying a sector for which the error correction processing has been executed. An error bit count includes the number of error bits (error bit count) detected for each sector. Correction success/failure information indicates whether error correction processing has been normally executed. In the following description, a combination of an error bit count and correction success/failure information will also be simply referred to as an "error bit count".

The row decoder 22 receives the row address of an address from the address register 13, and selects the block BLK based on the row address. The voltage supplied from the voltage generating circuit 17 is transferred to the selected block BLK via the row decoder 22.

At the time of the reading of data, the sense amplifier 23 senses the read data read from a memory cell transistor to a bit line, and transfers the sensed read data to the data register 24. At the time of the writing of data, the sense amplifier 23 transfers the write data written via a bit line to a memory cell transistor.

The data register 24 temporarily holds write data or read data. The data register 24 transmits, for example, held write data to the memory cell array 21. In addition, the data register 24 transmits, for example, held read data to the ECC circuit 18 and the input/output control circuit 11 via the column decoder 25.

The column decoder 25 receives the column address in an address from the address register 13, and reads the data on the column based on the column address from the data register 24.

1.1.2 Configuration of Memory Cell Array

The configuration of a memory cell array of the semiconductor storage device according to the first embodiment will be described with reference to FIG. 2. FIG. 2 shows one block BLK extracted from the memory cell array 21.

As shown in FIG. 2, each NAND string NS includes, for example, eight memory cell transistors MT, i.e., MT0 to MT7, a selection transistor ST1, and a selection transistor ST2. Note that the number of memory cell transistors MT is not limited to eight or any other specific number and may be, for example, 16, 32, 64, or 128. Each memory cell transistor MT includes a stacked gate including a control gate and a charge accumulation layer. Each memory cell transistor MT is series-connected between the selection transistors ST1 and ST2. Note that in the following description, being "connected" includes being connected via another conductive element (that is, being electrically connected).

The gates of all the selection transistors ST1 in each block BLK are commonly connected to a selection gate line SGD. In addition, the gates of all the selection transistors ST2 in each block BLK are commonly connected to a selection gate line SGS. The control gates of the memory cell transistors MT0 to MT7 in the same block BLK are respectively connected to word lines WL0 to WL7.

The other terminal of each of the selection transistors ST1 of a NAND string NS on the same row is connected to one of m bit lines BL, i.e., BL0 to BL(m−1) (m is a natural number). In addition, the bit line BL is commonly connected to the plurality of NAND strings NS on the same column throughout a plurality of blocks BLK.

The other terminal of each of the selection transistors ST2 is commonly connected to a source line CELSRC. The source line CELSRC is, for example, commonly connected to the plurality of NAND strings NS throughout the plurality of blocks BLK.

The sectional structure of the memory cell array 21 will be described next with reference to FIG. 3. FIG. 3 shows an example of the sectional structure of a portion of a memory cell array in the semiconductor storage device according to the first embodiment.

The semiconductor storage device 2 is provided on a semiconductor substrate 30. In the following description, a plane parallel to the surface of the semiconductor substrate 30 is defined as an X-Y plane, and a direction perpendicular to the X-Y plane is defined as the Z direction. Assume also that the X direction and the Y direction are orthogonal to each other.

A p-type well region 30$p$ is provided in the upper portion of the semiconductor substrate 30. For example, a plurality of n-type impurity diffusion regions 31 to 33 are provided in the upper portion of the p-type well region 30$p$ along the Y direction. Block insulating films 34 are respectively provided on those portions of the upper surface of the p-type well region 30$p$ which are located between the $n^+$-type impurity diffusion regions 31. Charge accumulation layers 35 functioning as floating gates (FG) are provided on the upper surfaces of the block insulating films 34. The charge accumulation layers 35 may be insulating layers. Wiring layers 36 functioning as word lines WL, i.e., WL0 to WL7, are provided above the charge accumulation layers 35. Each wiring layer 36 extends in, for example, the X direction. A wiring layer 37 functioning as the selection gate line SGD is provided above the p-type well region 30$p$ between the $n^+$-type impurity diffusion regions 31 and 32. A wiring layer 38 functioning as the selection gate line SGS is provided above the p-type well region 30$p$ between the $n^+$-type impurity diffusion regions 31 and 33. As described above, the selection transistor ST2, the plurality of memory cell transistors MT, and the selection transistor ST1 are provided above the p-type well region 30$p$ along the Y direction to form one NAND string NS. Wiring layers 39 and 40 respectively functioning as the bit line BL and the source line CELSRC are respectively provided on the upper surfaces of the $n^+$-type impurity diffusion regions 32 and 33.

1.1.3 Configuration of Data Register

FIG. 4 is a block diagram for describing the configuration of each data register of the semiconductor storage device according to the first embodiment. In FIG. 4, (A) and (B) respectively indicate a data register 24-0 corresponding to a plane PB0 and a data register 24-1 corresponding to a plane PB1.

As indicated by (A) in FIG. 4, the data register 24-0 includes data registers 24A and 24C. The data register 24A includes registers A1 and A2. The data register 24C includes registers C1 and C2. The registers A1, A2, C1, and C2 each have a memory area that can hold, for example, data corresponding to one page.

The data register 24A holds the 1-page data read from the memory cell array 21-0 which is planned to be transmitted first to the input/output control circuit 11. The data register 24C holds the 1-page data read from the memory cell array 21-0 which is planned to be transmitted to the input/output control circuit 11 after the data held in the data register 24A. That is, the data register 24C can be used as an area for temporarily holding the data read from the memory cell array 21-0 until the data held in the data register 24A is output.

The registers A1 and C1 temporarily hold the 1-page data read from the memory cell array 21-0 which is data before error correction by the ECC circuit 18. The registers A2 and C2 temporarily hold the 1-page data read from the memory cell array 21-0 which is data after error correction by the ECC circuit 18.

As indicated by (B) in FIG. 4, the data register 24-1 includes data registers 24B and 24D. The data register 24B includes registers B1 and B2. The data register 24D includes registers D1 and D2. The registers B1, B2, D1, and D2 each have a memory area that can hold, for example, data corresponding to one page.

The data register 24B holds the 1-page data read from the memory cell array 21-1 which is planned to be transmitted first to the input/output control circuit 11. The data register 24D holds the 1-page data read from the memory cell array 21-1 which is planned to be transmitted to the input/output control circuit 11 after the data held in the data register 24B. That is, the data register 24D can be used as an area for temporarily holding the data read from the memory cell array 21-1 until the data held in the data register 24B is output.

The registers B1 and D1 temporarily hold the 1-page data read from the memory cell array 21-1 which is data before error correction by the ECC circuit 18. The registers B2 and D2 temporarily hold the 1-page data read from the memory cell array 21-1 which is data after error correction by the ECC circuit 18.

Assume that in the following description, the data registers 24A to 24D hold read data according to a rule concerning the above data holding operation. However, the above case is merely an example, and the data registers 24A to 24D can hold data according to an arbitrary rule instead of the rule used in the above case.

1.2 Operation

An example of the operation of the semiconductor storage device according to the first embodiment will be described next. Note that in the following description, "read" of data from the memory cell array 21 to the data register 24 is, in particular, discriminated from "output" of data from the semiconductor storage device 2 to the controller 1.

1.2.1 Error Correction Result Output Operation

An error correction result output operation will be described first. FIG. 5 is a command sequence for describing the error correction result output operation of the semiconductor storage device according to the first embodiment. Referring to FIG. 5, assume that data has been read from the memory cell array 21 in advance, and error correction processing has been executed with respect to the read data. Assume also that an error correction result STS corresponding to the read data is held as status information in the status register 15.

As shown in FIG. 5, the controller 1 issues command "7xh". Command "7xh" is a generic term of commands for instructing the semiconductor storage device 2 to output the error correction result STS on the 1-page data read from the memory cell array 21 in accordance with various types of reading schemes. The various types of reading schemes include, for example, a multi-plane reading scheme, cache reading scheme, and multi-plane cache reading scheme. Command "7xh" includes a plurality of commands identifiable to each other in accordance with the various types of reading schemes. The details of command "7xh" and the details of the multi-plane reading scheme, cache reading scheme, and multi-plane cache reading scheme will be described later.

When command "7xh" is stored in the command register 14, the sequencer 16 specifies the 1-page data read by the reading scheme corresponding to command "7xh". The sequencer 16 then transfers the error correction result STS concerning the specified 1-page data from the status register 15 to the input/output control circuit 11. The input/output control circuit 11 outputs, for example, the error correction result STS corresponding to the 1-page data upon dividing the error correction result STS into data Sect0 to Sect3 throughout four cycles. The data Sect0 to Sect3 respectively include, for example, the error correction results STS on sector 0 to sector 3.

That is, when command "7xh" is issued, the semiconductor storage device 2 sequentially outputs the error correction result STS corresponding to 1-page data for each sector.

Note that the controller 1 maintains the signal /CE at "L" level, and the signal /RB at "H" level throughout the period shown in FIG. 5. When inputting a command to the semiconductor storage device 2, the controller 1 asserts the signal CLE (sets it at "H" level). When causing the semiconductor storage device 2 to output the error correction result STS, the controller 1 toggles the signal /RE.

1.2.2 Multi-Plane Reading Operation

A multi-plane reading operation will be described next.

1.2.2.1 Outline of Operation

FIG. 6 is a block diagram for describing an outline of the multi-plane reading operation of the semiconductor storage device according to the first embodiment. FIG. 6 shows how read data in a multi-plane reading operation and the error correction result STS on the read data are communicated in the semiconductor storage device 2. In addition, FIG. 6 shows, in steps ST1 to ST12, how is a communication sequence from the reading of data from the memory cell array 21 to the transfer of the read data to the input/output control circuit 11. The sequencer 16 executes steps ST1 to ST12 based on, for example, instructions from the controller 1.

As shown in FIG. 6, in step ST1, the sequencer 16 reads data from the memory cell array 21-0, and transfers the data to the register A1 in the data register 24A. In step ST2, the sequencer 16 reads data from the memory cell array 21-1, and holds the data in the register B1 in the data register 24B. In a multi-plane reading operation, the sequencer 16 concurrently reads data from the planes PB0 and PB1. That is, the sequencer 16 concurrently executes steps ST1 and ST2.

In step ST3, the ECC circuit 18 executes error detection processing and error correction processing for the read data held in the register A1 to generate post-error correction data and an error correction result STS-P0. The error correction result STS-P0 is the error correction result STS corresponding to the data read from the plane PB0.

In step ST4, the ECC circuit 18 transfers the post-error correction data generated in step ST3 to the register A2.

In step ST5, the ECC circuit 18 transfers the error correction result STS-P0 generated in step ST3 to the status register 15.

In step ST6, the ECC circuit 18 executes error detection processing and error correction processing for the read data held in the register B1 to generate post-error correction data and an error correction result STS-P1. The error correction result STS-P1 is the error correction result STS corresponding to the data read from the plane PB1.

In step ST7, the ECC circuit 18 transfers the post-error correction data generated in step ST6 to the register B2.

In step ST8, the ECC circuit 18 transfers the error correction result STS-P1 generated in step ST6 to the status register 15.

In step ST9, the sequencer 16 reads the error correction result STS-P0 from the status register 15, and outputs the result to the controller 1 via the input/output control circuit 11.

In step ST10, the sequencer 16 outputs the post-error correction data held in the register A2 as output data DAT-P0 to the controller 1 via the input/output control circuit 11.

In step ST11, the sequencer 16 reads the error correction result STS-P1 from the status register 15, and outputs the result to the controller 1 via the input/output control circuit 11.

In step ST12, the sequencer 16 outputs the post-error correction data held in the register B2 as output data DAT-P1 to the controller 1 via the input/output control circuit 11.

This is the end of the multi-plane reading operation.

1.2.2.2 Command Sequence

Figure 7:
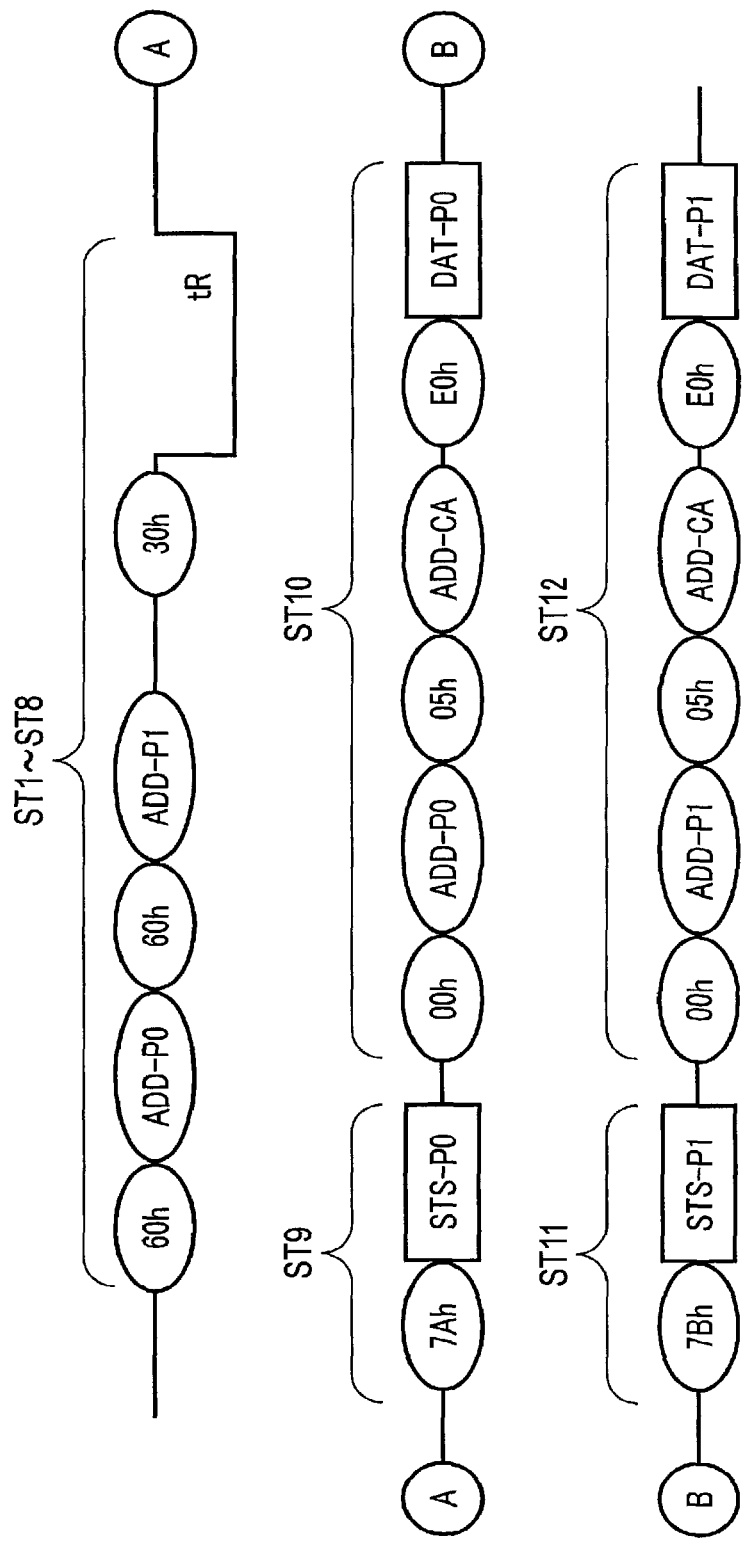
FIG. 7 is a command sequence for describing the multi-plane reading operation of the semiconductor storage device according to the first embodiment.

FIG. 7 is a command sequence for describing the multi-plane reading operation of the semiconductor storage device according to the first embodiment. FIG. 7 shows an example of a command sequence for implementing the multi-plane reading operation shown in FIG. 6.

As shown in FIG. 7, the controller 1 transmits command "60h", address "ADD-P0", command "60h", and address "ADD-P1" to the semiconductor storage device 2 in the order named. Command "60h" is a command for instructing a multi-plane reading operation with respect to the plane PB designated by the subsequent address. Addresses "ADD-P0" and "ADD-P1" respectively include information designating given pages in the planes PB0 and PB1. That is, upon receiving command "60h", address "ADD-P0", command "60h", and address "ADD-P1" in the order named, the sequencer 16 performs setting to concurrently execute reading corresponding to address "ADD-P0" in the plane PB0 and reading corresponding to address "ADD-P1" in the plane PB1.

Subsequently, the controller 1 transmits command "30h" to the semiconductor storage device 2. Command "30h" is a command for instructing to read data corresponding to the address transmitted immediately before the command from the memory cell array 21. That is, in this case, command "30h" instructs the semiconductor storage device 2 to concurrently read data from the memory cell arrays 21-0 and 21-1. In addition, command "30h" indicates that read data are suspended without being output to the controller 1, and there is a subsequent instruction.

Upon receiving command "30h", the semiconductor storage device 2 sets the signal R/B at "L" level during a period tR to notify the controller 1 of a busy state. The sequencer 16 controls the memory cell arrays 21-0 and 21-1, the ECC circuit 18, and the like during the period tR to cause them to execute steps ST1 to ST8 shown in FIG. 6. With this operation, the post-error correction data of the data read from the memory cell arrays 21-0 and 21-1 are respectively held in the registers A2 and B2, and the error correction results STS-P0 and STS-P1 are individually held in the status register 15. Note that the reading of data from the memory cell array 21-0 to the register A1 is executed concurrently with the reading of data from the memory cell array 21-1 to the register B1, as described above. After the end of the above operation, the semiconductor storage device 2 sets the signal R/B at "H" level to notify the controller 1 of a ready state.

Subsequently, the controller 1 transmits command "7Ah" to the semiconductor storage device 2. Command "7Ah" is one of the commands included in commands "7xh", and is, for example, a command for instructing to output the error correction result STS-P0 to the controller 1.

Upon receiving command "7Ah", the semiconductor storage device 2 executes step ST9 shown in FIG. 6. That is, the sequencer 16 outputs the error correction result STS-P0 held in the status register 15 to the controller 1.

Based on the error correction result STS-P0, the controller 1 confirms that the data read from the plane PB0 has normally undergone error correction, and then transmits command "00h" to the semiconductor storage device 2. Command "00h" corresponds to an address input reception command, and is a command for instructing an operation for outputting data from the semiconductor storage device 2 to the controller 1. Subsequently, the controller 1 transmits address "ADD-P0" to the semiconductor storage device 2. This causes the semiconductor storage device 2 to recognize the issuance of an instruction to output the data read from the plane PB0.

Subsequently, the controller 1 transmits command "05h" and address "ADD-CA" to the semiconductor storage device 2. Command "05h" is a command for instructing to read data at the column address designated by subsequent address "ADD-CA". The controller 1 then transmits command "E0h" to the semiconductor storage device 2. Command "E0h" is a command for instructing to output the data held in the data register 24 to the controller 1 based on the information designated immediately before the command.

Upon receiving command "E0h", the semiconductor storage device 2 executes step ST10 shown in FIG. 6. That is, the sequencer 16 outputs the post-error correction data held in the register A2 as the output data DAT-P0 to the controller 1.

Subsequently, the controller 1 transmits command "7Bh" to the semiconductor storage device 2. Command "7Bh" is one of the commands included in commands "7xh" and is a command for instructing to output the error correction result STS-P1.

Upon receiving command "7Bh", the semiconductor storage device 2 executes step ST11 shown in FIG. 6. That is, the sequencer 16 outputs the error correction result STS-P1 held in the status register 15 to the controller 1.

Based on the error correction result STS-P1, the controller 1 confirms that the data read from the plane PB1 has normally undergone error correction, and then transmits command "00h" and address "ADD-P1" to the semiconductor storage device 2. Based on address "ADD-P1", the semiconductor storage device 2 recognizes the issuance of an instruction to output the data read from the plane PB1. The controller 1 then transmits command "05h", address "ADD-CA", and command "E0h" to the semiconductor storage device 2.

Upon receiving command "E0h", the semiconductor storage device 2 executes step ST12 shown in FIG. 6. That is, the sequencer 16 outputs the post-error correction data held in the register B2 as the output data DAT-P1 to the controller 1.

With the above operation, the semiconductor storage device 2 can individually output the error correction results STS-P0 and STS-P1 to the controller 1 before the output of the data DAT-P0 and DAT-P1 in the multi-plane reading operation.

1.2.3 Cache Reading Operation

A cache reading operation will be described next.

1.2.3.1 Outline of Operation

FIG. 8 is a block diagram for describing an outline of the cache reading operation of the semiconductor storage device according to the first embodiment. FIG. 8 shows how is the communication of read data in a cache reading operation and the error correction result STS on the read data in the semiconductor storage device 2. In the following description, the error correction result STS and output data DAT corresponding to the data read at the nth reading operation from the memory cell array 21 are respectively denoted as an error correction result STS-(n) and output data DAT-(n) (n is an arbitrary natural number).

FIG. 8 shows, in steps ST21 to ST27, how communication is performed when data is read from the memory cell array 21, and the data is output to the controller 1 concurrently with the data reading operation. The sequencer 16 executes steps ST21 to ST27 based on, for example, instructions from the controller 1. Assume that in the following description, the post-error correction data of the data read from the memory cell array 21-0 at the (n+1)th reading operation in this cache reading operation is held as output data DAT-(n+1) in the register C2. Assume also that an error correction result STS-(n+1) corresponding to the output data DAT-(n+1) is held in the status register 15. FIG. 8 shows a case in which data is read from the memory cell array 21-0 at the (n+2)th reading operation in the cache reading operation.

As shown in FIG. 8, in step ST21, the sequencer 16 transfers the post-error correction data held in the register C2 to the register A2. In addition, the sequencer 16 may transfer the pre-error correction data held in the register C1 to the register A1.

In step ST22, the sequencer 16 executes the (n+2)th data reading operation from the memory cell array 21-0 in the cache reading operation, and transfers the read data to the register C1 in the data register 24C.

In step ST23, the ECC circuit 18 executes error detection processing and error correction processing for the read data held in the register C1 to generate post-error correction data and error correction result STS-(n+2).

In step ST24, the ECC circuit 18 transfers the post-error correction data generated in step ST23 to the register C2.

In step ST25, the ECC circuit 18 transfers the error correction result STS-(n+2) generated in step ST23 to the status register 15. The status register 15 individually holds the error correction result STS-(n+2) and the error correction result STS-(n+1) that has already been held.

In a cache reading operation, the sequencer 16 concurrently executes steps ST21 to ST25 associated with the (n+2)th reading operation and subsequent steps ST26 and ST27 associated with the (n+1)th output operation.

In step ST26, the sequencer 16 reads the error correction result STS-(n+1) from the status register 15, and outputs the result to the controller 1 via the input/output control circuit 11.

In step ST27, the sequencer 16 outputs the post-error correction data held in the register A2 as the output data DAT-(n+1) to the controller 1 via the input/output control circuit 11.

The state immediately after step ST27 coincides with the state immediately before step ST21 except that the data held in the data register 24 and the status register 15 have changed. For this reason, repeating the operation in steps ST21 to ST27 again after step ST27 can repeatedly execute a cache reading operation.

1.2.3.2 Command Sequence

Figure 9:
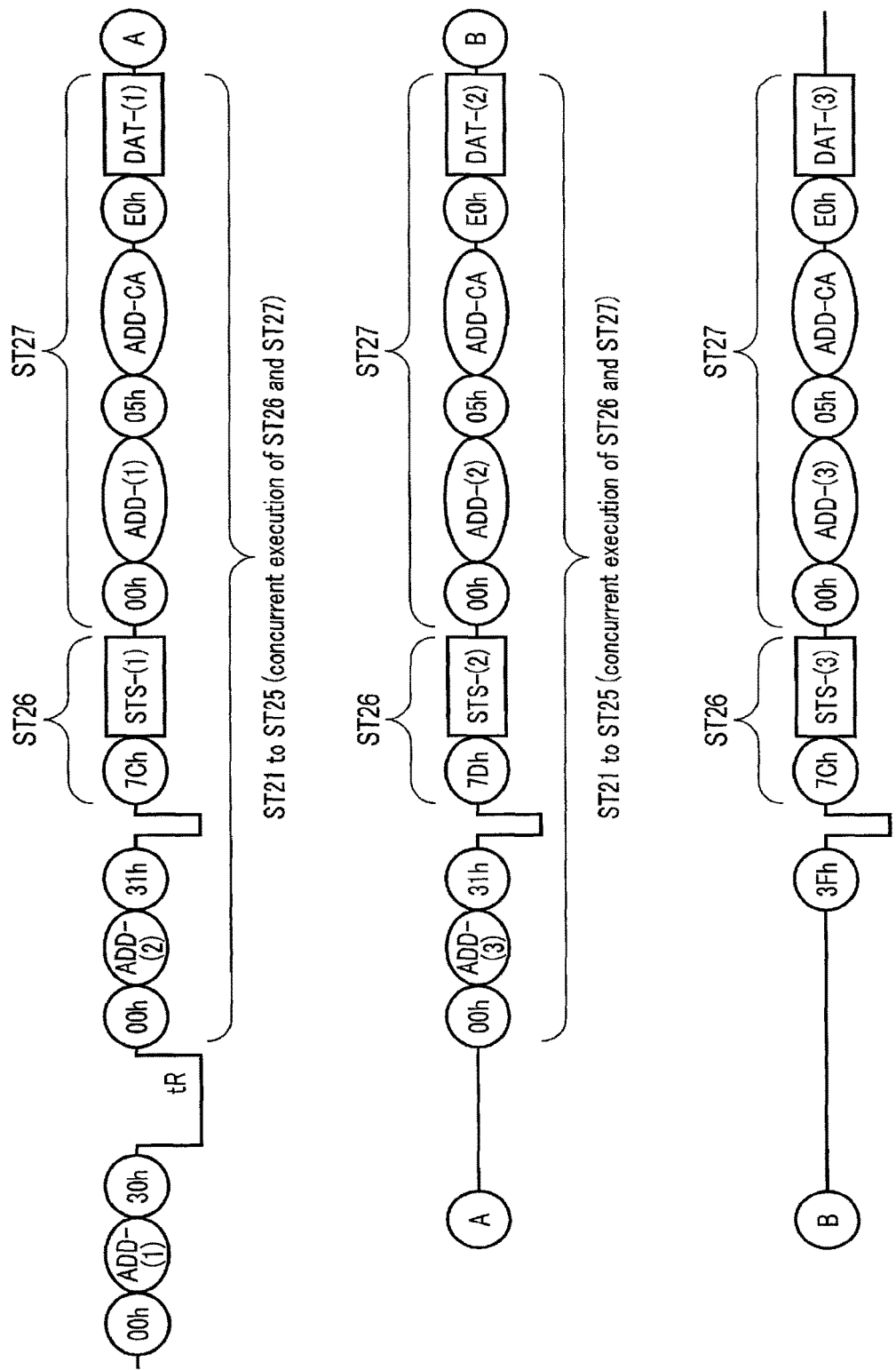
FIG. 9 is a command sequence for describing the cache reading operation of the semiconductor storage device according to the first embodiment.

FIG. 9 is a command sequence for describing the cache reading operation of the semiconductor storage device according to the first embodiment. FIG. 9 shows an example of the command sequence for implementing the cache reading operation shown in FIG. 8, and shows, for example, a cache reading operation with respect to the plane PB0. Note that FIG. 9 shows a case in which the random cache reading operation of outputting the data of an arbitrary page is executed as an example of a cache reading operation.

As shown in FIG. 9, the controller 1 transmits command "00h", address "ADD-(1)", and command "30h" to the semiconductor storage device 2. Address "ADD-(1)" includes, for example, information designating the address of the data to be read at the first reading operation in the cache reading operation sequence.

Upon receiving command "30h", the semiconductor storage device 2 sets the signal R/B at "L" level during the period tR to notify the controller 1 of a busy state. The sequencer 16 reads data from the memory cell array 21-0 and transfers the data to the register C1 during the period tR. The ECC circuit 18 executes error correction processing for the data held in the register C1, and transfers the post-error correction data to the register C2. In addition, the ECC circuit 18 transfers the error correction result STS-(1) to the status register 15. After the end of the above operation, the semiconductor storage device 2 sets the signal R/B at "H" level to notify the controller 1 of a ready state.

In this case, the state of the semiconductor storage device 2 coincides with the state immediately before step ST21 shown in FIG. 8.

Subsequently, the controller 1 transmits command "00h", address "ADD-(2)", and command "31h" to the semiconductor storage device 2. Address "ADD-(2)" includes information designating the address of the data to be read at the second reading operation in the cache reading operation sequence. Command "31h" is a command for instructing to read data corresponding to the address transmitted immediately before the command from the memory cell array 21. Command "31h" is a command for instructing to temporarily hold the data to be read next. Note that the data read at the second reading operation is held without overwriting the data read at the first reading operation.

Upon receiving command "31h", the semiconductor storage device 2 executes steps ST21 to ST25 shown in FIG. 8. That is, the sequencer 16 sets the signal R/B at "L" level to notify the controller 1 of a busy state while the data held in the registers C1 and C2 are respectively transferred to the registers A1 and A2. Upon completing the data transfer between the registers, the semiconductor storage device 2 sets the signal R/B at "H" level to notify the controller 1 of a ready state. The sequencer 16 then reads data corresponding to address "ADD-(2)" from the memory cell array 21-0, and transfers the data to the register C1. The ECC circuit 18 executes error correction processing for the data held in the register C1, and transfers the post-error correction data to the register C2, as well as transferring the error correction result STS-(2) to the status register 15. The error correction result STS-(2) is held in the status register 15 without overwriting the error correction result STS-(1).

The controller 1 and the semiconductor storage device 2 execute steps ST26 and ST27 shown in FIG. 8 concurrently with steps ST22 to ST25.

More specifically, the controller 1 transmits command "7Ch" to the semiconductor storage device 2. Command "7Ch" is one of the commands included in command "7xh", and instructs to output, for example, an error correction result STS-(odd) ("odd" is an arbitrary odd number) corresponding to the data read at the odd-number-th reading operation in a cache reading operation.

Upon receiving command "7Ch", the semiconductor storage device 2 outputs, to the controller 1, the error correction result STS-(1), of the error correction results STS-(n) held in the status register 15, which corresponds to the data read at the first reading operation.

Based on the error correction result STS-(1), the controller 1 confirms that the read data has normally undergone error correction. The controller 1 then transmits command "00h", address "ADD-(1)", command "05h", address "ADD-CA", and command "E0h" to the semiconductor storage device 2 in the order named.

Upon receiving command "E0h", the semiconductor storage device 2 outputs the post-error correction data held in the register A2 as read data DAT-(1) to the controller 1.

In this case, the state of the semiconductor storage device 2 coincides again with the state immediately before step ST21 shown in FIG. 8.

Subsequently, the controller 1 transmits command "00h", address "ADD-(3)", and command "31h" to the semiconductor storage device 2. Address "ADD-(3)" includes information designating the address of the data read at the third reading operations in the cache reading operation sequence.

Upon receiving command "31h", the semiconductor storage device 2 executes steps ST21 to ST25 shown in FIG. 8. That is, the sequencer 16 respectively transfers the data held in the registers C1 and C2 to the registers A1 and A2. The sequencer 16 reads data corresponding to address "ADD-(3)" from the memory cell array 21-0, and transfers the data to the register C1. The ECC circuit 18 executes error correction processing for the data held in the register C1, and transfers the post-error correction data to the register C2, as well as transferring the error correction result STS-(3) to the status register 15. The ECC circuit 18 causes the status register 15 to hold, for example, the error correction result STS-(3) by overwriting the error correction result STS-(1) corresponding to the data read at the odd-number-th reading operation.

The controller 1 and the semiconductor storage device 2 execute steps ST26 and ST27 shown in FIG. 8 concurrently with steps ST21 to ST25.

More specifically, the controller 1 transmits command "7Dh" to the semiconductor storage device 2. Command "7Dh" is one of the commands included in commands "7xh", and instructs to, for example, output an error correction result STS-(even) ("even" is an arbitrary even number) corresponding to the data read at the even-number-th reading operation in a cache reading operation.

Upon receiving command "7Dh", the semiconductor storage device 2 outputs, to the controller 1, an error correction result STS-(2), of the error correction results STS-(n) held in the status register 15, which corresponds to the data read at the second reading operation.

Based on the error correction result STS-(2), the controller 1 confirms that the read data has normally undergone error correction. The controller 1 then transmits command "00h", address "ADD-(2)", command "05h", address "ADD-CA", and command "E0h" to the semiconductor storage device 2 in the order named.

Upon receiving command "E0h", the semiconductor storage device 2 outputs the post-error correction data held in the register A2 as read data DAT-(2) to the controller 1.

Subsequently, the controller 1 transmits command "3Fh" to the semiconductor storage device 2. Command "3Fh" is a command for instructing not to read data from the memory cell array 21 any longer in the cache reading operation sequence.

Upon receiving command "3Fh", the semiconductor storage device 2 respectively transfers the data held in the registers C1 and C2 to the registers A1 and A2 to prepare for the outputting of the data.

The controller 1 transmits command "7Ch" to the semiconductor storage device 2. Upon receiving command "7Ch", the semiconductor storage device 2 outputs, to the controller 1, an error correction result STS-(3), of the error correction results STS-(n) held in the status register 15, which corresponds to the data read at the third reading operation.

Based on the error correction result STS-(3), the controller 1 confirms that the read data has normally undergone error correction. The controller 1 then transmits command "00h", address "ADD-(3)", command "05h", address "ADD-CA", and command "E0h" to the semiconductor storage device 2 in the order named.

Upon receiving command "E0h", the semiconductor storage device 2 outputs the post-error correction data held in the register A2 as read data DAT-(3) to the controller 1.

With the above operation, the semiconductor storage device 2 can individually output the error correction result STS corresponding to each data when concurrently executing the reading of data from the memory cell array 21-0 and the outputting of data to the controller 1.

1.2.4 Multi-Plane Reading Operation with Data Cache

A multi-plane reading operation with data cache will be described next.

1.2.4.1 Outline of Operation

FIG. 10 is a block diagram for describing an outline of the multi-plane reading operation with data cache of the semiconductor storage device according to the first embodiment. FIG. 10 shows how is the communication of read data in a multi-plane reading operation with data cache and the error correction result STS on the read data in the semiconductor storage device 2. In the following description, the error correction result STS and output data DAT corresponding to the data read from the memory cell array 21-0 at the nth reading operation are respectively denoted as an error correction result STS-P0(n) and output data DAT-P0(n). In addition, the error correction result STS and output data DAT corresponding to the data read from the memory cell array 21-1 at the nth reading operation are respectively denoted as an error correction result STS-P1(n) and output data DAT-P1(n).

FIG. 10 shows, in steps ST31 to ST44, how communication is performed when data is read from the memory cell array 21, and the data is output to the controller 1 concurrently with the data reading operation. The sequencer 16 executes steps ST31 to ST44 based on, for example, instructions from the controller 1.

Assume that in the following description, the post-error correction data of the data read from the memory cell arrays 21-0 and 21-1 at the (n+1)th reading operation in this multi-plane reading operation with data cache are respectively held as output data DAT-P0 (n+1) and DAT-P1 (n+1) in the registers C2 and D2. Assume also that error correction results STS-P0 (n+1) and STS-P1 (n+1) respectively corresponding to the output data DAT-P0 (n+1) and DAT-P1 (n+1) are individually held in the status register 15. FIG. 10 shows a case in which the (n+2)th reading operation in the cache reading operation is executed with respect to the memory cell arrays 21-0 and 21-1.

As shown in FIG. 10, the operation associated with the plane PB0 is executed in steps ST31 to ST35, ST41, and ST42, whereas the operation associated with the plane PB1 is executed in steps ST36 to ST40, ST43, and ST44.

More specifically, in step ST31, the sequencer 16 transfers the post-error correction data held in the register C2 to the register A2. The sequencer 16 may also transfer the post-error correction data held in the register C1 to the register A1.

In step ST32, the sequencer 16 executes the (n+2)th data reading operation from the memory cell array 21-0 in the multi-plane reading operation with data cache, and transfers the data to the register C1.

In step ST33, the ECC circuit 18 executes error detection processing and error correction processing for the read data held in the register C1 to generate post-error correction data and error correction result STS-P0 (n+2).

In step ST34, the ECC circuit 18 transfers the post-error correction data generated in step ST33 to the register C2.

In step ST35, the ECC circuit 18 transfers the error correction result STS-P0 (n+2) generated in step ST33 to the status register 15. The status register 15 holds the error correction result STS-P0 (n+2) independently of the error correction results STS-P0 (n+1) and STS-P1 (n+1).

In step ST36, the sequencer 16 transfers the post-error correction data held in the register D2 to the register B2. In addition, the sequencer 16 may transfer the pre-error correction data held in the register D1 to the register B1.

In step ST37, the sequencer 16 executes the (n+2)th data reading operation from the memory cell array 21-1 in the multi-plane reading operation with data cache, and transfers the read data to the register D1.

In step ST38, the ECC circuit 18 executes error detection processing and error correction processing for the read data held in the register D1 to generate post-error correction data and an error correction result STS-P1 (n+2).

In step ST39, the ECC circuit 18 transfers the post-error correction data generated in step ST38 to the register D2.

In step ST40, the ECC circuit 18 transfers the error correction result STS-P1 (n+2) generated in step ST38 to the status register 15. The status register 15 holds the error correction result STS-P1 (n+2) independently of the error correction results STS-P0 (n+1), STS-P1 (n+1), and STS-P0 (n+2).

In a multi-plane reading operation with data cache, data are concurrently read from the planes PB0 and PB1. That is, steps ST32 and ST37 are concurrently executed. In addition, in a multi-plane reading operation with data cache, the sequencer 16 concurrently executes steps ST31 to ST40 associated with the (n+2)th reading operation and subsequent steps ST41 to ST44 associated with the (n+1)th output operation.

In step ST41, the sequencer 16 reads the error correction result STS-P0 (n+1) from the status register 15, and outputs the result to the controller 1 via the input/output control circuit 11.

In step ST42, the sequencer 16 outputs the post-error correction data held in the register A2 as the output data DAT-P0 (n+1) to the controller 1 via the input/output control circuit 11.

In step ST43, the sequencer 16 reads the error correction result STS-P1 (n+1) from the status register 15, and outputs the result to the controller 1 via the input/output control circuit 11.

In step ST44, the sequencer 16 outputs the post-error correction data held in the register B2 as the output data DAT-P1 (n+1) to the controller 1 via the input/output control circuit 11.

The state immediately after step ST44 coincides with the state immediately after step ST31 except that the data held in the data register 24 and the status register 15 have changed. That is, repeating the operation in steps ST31 to ST44 again after step ST44 can repeatedly execute a multi-plane reading operation with data cache.

1.2.4.2 Command Sequence

Figure 11:
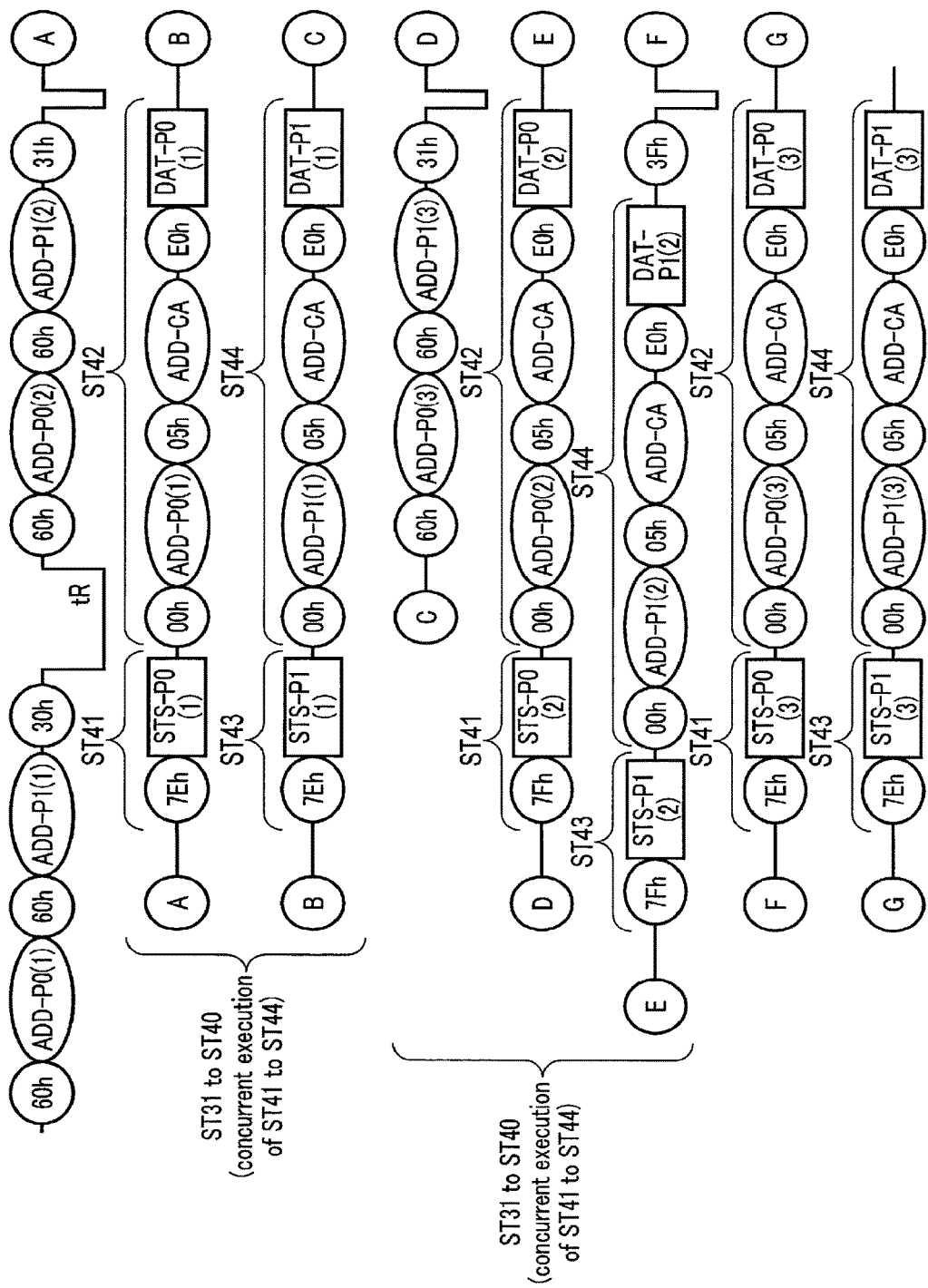
FIG. 11 is a command sequence for describing the multi-plane reading operation with data cache of the semiconductor storage device according to the first embodiment.

FIG. 11 is a command sequence for describing the multi-plane reading operation with data cache of the semiconductor storage device according to the first embodiment. FIG. 11 shows an example of the command sequence for implementing the multi-plane reading operation with data cache shown in FIG. 10. FIG. 11 shows a case in which a random cache reading operation is executed as an example of a multi-plane reading operation with data cache.

As shown in FIG. 11, the controller 1 transmits command "60h", address "ADD-P0 (1)", command "60h", address "ADD-P1 (1)", and command "30h" to the semiconductor storage device 2 in the order named. Addresses "ADD-P0 (1)" and "ADD-P1 (1)" respectively include information designating the data to be read at the first reading operations from the planes PB0 and PB1 in the multi-plane reading operation with data cache. That is, upon receiving command "60h", address "ADD-P0 (1)", command "60h", and address "ADD-P1 (1)" in the order named, the sequencer 16 performs setting to concurrently execute reading corresponding to address "ADD-P0 (1)" in the plane PB0 and reading corresponding to address "ADD-P1 (1)" in the plane PB1.

Upon receiving command "30h", the semiconductor storage device 2 sets the signal R/B at "L" level during the period tR to notify the controller 1 of a busy state. The sequencer 16 concurrently reads data from the memory cell arrays 21-0 and 21-1 and transfers the data to the registers C1 and D1 during the period tR. The ECC circuit 18 executes error correction processing for the data held in the register C1, and transfers the post-error correction data to the register C2. In addition, the ECC circuit 18 transfers, to the status register 15, the error correction result STS-P0(1) corresponding to the post-error correction data transferred to the register C2. The ECC circuit 18 also executes error correction processing for the data held in the register D1, and transfers the post-error correction data to the register D2. In addition, the ECC circuit 18 transfers, to the status register 15, the error correction result STS-P1(1) corresponding to the post-error correction data transferred to the register D2. The status register 15 individually holds the error correction results STS-P0(1) and STS-P1(1). After the end of the above operation, the semiconductor storage device 2 sets the signal R/B at "H" level to notify the controller 1 of a ready state.

In this case, the state of the semiconductor storage device 2 coincides with the state immediately before step ST31 shown in FIG. 10.

Subsequently, the controller 1 transmits command "60h", address "ADD-P0 (2)", command "60h", address "ADD-P1

(2)", and command "31h" to the semiconductor storage device 2 in the order named. Address "ADD-P0 (2)" and "ADD-P1 (2)" include information designating the addresses of data to be read at the second reading operations in the multi-plane reading operation with data cache sequence.

Upon receiving command "31h", the semiconductor storage device 2 executes steps ST31 to ST40 shown in FIG. 10. That is, the sequencer 16 sets the R/B signal at "L" level to notify the controller 1 of a busy state while transferring the data held in the registers C1, C2, D1, and D2 to the registers A1, A2, B1, and B2. Upon completing the data transfer between the registers, the semiconductor storage device 2 sets the signal R/B at "H" level to notify the controller 1 of a ready state. The sequencer 16 then concurrently reads data corresponding to addresses "ADD-P0 (2)" and "ADD-P1 (2)" from the memory cell arrays 21-0 and 21-1, and transfers the data to the registers C1 and D1. The ECC circuit 18 executes error correction processing for the data held in the registers C1 and D2, and transfers the respective post-error correction data to the registers C2 and D2. The ECC circuit 18 transfers, to the status register 15, the error correction results STS-P0(2) and STS-P1(2) respectively corresponding to the post-error correction data respectively transferred to the registers C2 and D2. The status register 15 individually holds the error correction results STS-P0(1), STS-P1(1), STS-P0(2), and STS-P1(2).

The controller 1 and the semiconductor storage device 2 execute steps ST41 to ST44 shown in FIG. 10 concurrently with steps ST31 to ST40.

More specifically, the controller 1 transmits command "7Eh" to the semiconductor storage device 2. Command "7Eh" is one of the commands included in the commands "7xh", and instructs to output, for example, the error correction result STS-(odd) corresponding to the data read at the odd-number-th reading operation in a multi-plane reading operation with data cache. In addition, when commands "7Eh" are consecutively issued, first command "7Eh" is recognized as, for example, a command corresponding to a plane PB0 (odd).

Upon receiving command "7Eh", the semiconductor storage device 2 outputs, to the controller 1, the error correction result STS-P0(1), of the error correction results STS-P0 (n) held in the status register 15, which corresponds to the data read at the first reading operation.

Based on the error correction result STS-P0(1), the controller 1 confirms that the read data has normally undergone error correction. The controller 1 then transmits command "00h", address "ADD-P0 (1)", command "05h", address "ADD-CA", and command "E0h" to the semiconductor storage device 2 in the order named.

Upon receiving command "E0h", the semiconductor storage device 2 outputs the post-error correction data held in the register A2 as read data DAT-P0(1) to the controller 1.

In addition, the controller 1 transmits again command "7Eh" to the semiconductor storage device 2. When commands "7Eh" are consecutively issued, second command "7Eh" is recognized as, for example, a command corresponding to the plane PB1.

Upon receiving command "7Eh", the semiconductor storage device 2 outputs, to the controller 1, the error correction result STS-P1(1), of the error correction results STS-P1 (n) held in the status register 15, which corresponds to the data read at the first reading operation.

Based on the error correction result STS-P1(1), the controller 1 confirms that the read data has normally undergone error correction. The controller 1 then transmits command "00h", address "ADD-P1 (1)", command "05h", address "ADD-CA", and command "E0h" to the semiconductor storage device 2 in the order named.

Upon receiving command "E0h", the semiconductor storage device 2 outputs the post-error correction data held in the register B2 as the read data DAT-P1(1) to the controller 1.

In this case, the state of the semiconductor storage device 2 coincides again with the state immediately before step ST31 shown in FIG. 10.

Subsequently, the controller 1 transmits command "60h", address "ADD-P0 (3)", command "60h", address "ADD-P1 (3)", and command "31h" to the semiconductor storage device 2 in the order named. Addresses "ADD-P0 (3)" and "ADD-P1 (3)" respectively include information designating the addresses of the data read at the third reading operations in the multi-plane reading operation with data cache sequence.

Upon receiving command "31h", the semiconductor storage device 2 executes steps ST31 to ST40 shown in FIG. 10. That is, the sequencer 16 respectively transfers the data held in the registers C1, C2, D1, and D2 to the registers A1, A2, B1, and B2. The sequencer 16 reads data corresponding to addresses "ADD-P0 (3)" and "ADD-P1 (3)" from the memory cell arrays 21-0 and 21-1, and transfers the data to the registers C1 and D1. The ECC circuit 18 executes error correction processing for the data held in the register C1, and transfers the post-error correction data to the register C2 as well as transferring, to the status register 15, an error correction result STS-P0(3) corresponding to the post-error correction data transferred to the register C2. In addition, the ECC circuit 18 executes error correction processing for the data held in the register D1, and transfers the post-error correction data to the register D2 as well as transferring, to the status register 15, an error correction result STS-P1(3) corresponding to the post-error correction data transferred to the register D2. The ECC circuit 18 causes the status register 15 to hold, for example, the error correction results STS-P0(3) and STS-P1(3) by overwriting the error correction results STS-P0(1) and STS-P1(1) corresponding to the read data at the odd-number-th reading operations.

The controller 1 and the semiconductor storage device 2 execute steps ST41 to ST44 shown in FIG. 10 concurrently with steps ST31 to ST40.

More specifically, the controller 1 transmits command "7Fh" to the semiconductor storage device 2. Command "7Fh" is one of the commands included in commands "7xh", and, for example, instructs to output the error correction result STS-(even) corresponding to the data read at the even-number-th reading operation in the multi-plane reading operation with data cache. In addition, when commands "7Fh" are consecutively issued, first command "7Fh" is recognized as, for example, a command corresponding to the plane PB0.

Upon receiving command "7Fh", the semiconductor storage device 2 outputs, to the controller 1, the error correction result STS-P0(2), of the error correction results STS-P0 (n) held in the status register 15, which corresponds to the data read at the second reading operation.

Based on the error correction result STS-P0(2), the controller 1 confirms that the read data has normally undergone error correction. The controller 1 then transmits command "00h", address "ADD-P0 (2)", command "05h", address "ADD-CA", and command "E0h" to the semiconductor storage device 2 in the order named.

Upon receiving command "E0h", the semiconductor storage device 2 outputs the post-error correction data held in the register A2 as read data DAT-P0(2) to the controller 1.

In addition, the controller 1 transmits again the command "7Fh" to the semiconductor storage device 2. When commands "7Fh" are consecutively issued, second command "7Fh" is recognized as, for example, a command corresponding to the plane PB1.

Upon receiving command "7Fh", the semiconductor storage device 2 outputs, to the controller 1, the error correction result STS-P1(2), of the error correction results STS-P1 (n) held in the status register 15, which corresponds to the data read at the second reading operation.

Based on the error correction result STS-P1(2), the controller 1 confirms that the read data has normally undergone error correction. The controller 1 then transmits command "00h", address "ADD-P1 (2)", command "05h", address "ADD-CA", and command "E0h" to the semiconductor storage device 2 in the order named.

Upon receiving command "E0h", the semiconductor storage device 2 outputs the post-error correction data held in the register B2 as the read data DAT-P1(2) to the controller 1.

Subsequently, the controller 1 transmits command "3Fh" to the semiconductor storage device 2. Upon receiving command "3Fh", the semiconductor storage device 2 respectively transfers the data held in the registers C1, C2, D1, and D2 to the registers A1, A2, B1, and B2 to prepare for the outputting of the data.

The controller 1 transmits command "7Eh" to the semiconductor storage device 2. Upon receiving command "7Eh", the semiconductor storage device 2 outputs, to the controller 1, the error correction result STS-P0(3), of the error correction results STS-P0 (n) held in the status register 15, which corresponds to the data read at the third reading operation.

Based on the error correction result STS-P0(3), the controller 1 confirms that the read data has normally undergone error correction. The controller 1 then transmits command "00h", address "ADD-P0 (3)", command "05h", address "ADD-CA", and command "E0h" to the semiconductor storage device 2 in the order named.

Upon receiving command "E0h", the semiconductor storage device 2 outputs the post-error correction data held in the register A2 as read data DAT-P0(3) to the controller 1.

In addition, the controller 1 transmits command "7Eh" to the semiconductor storage device 2. Upon receiving command "7Eh", the semiconductor storage device 2 outputs, to the controller 1, the error correction result STS-P1(3), of the error correction results STS-P1 (n) held in the status register 15, which corresponds to the data read at the third reading operation.

Based on the error correction result STS-P1(3), the controller 1 confirms that the read data has normally undergone error correction. The controller 1 then transmits command "00h", address "ADD-P1 (3)", command "05h", address "ADD-CA", and command "E0h" to the semiconductor storage device 2 in the order named.

Upon receiving command "E0h", the semiconductor storage device 2 outputs the post-error correction data held in the register A2 as read data DAT-P1(3) to the controller 1.

With the above operation, even in a multi-plane reading operation with data cache, in which cache reading from the plane PB0 and cache reading from the plane PB1 are concurrently executed, the semiconductor storage device 2 can individually output the error correction results STS corresponding to the respective data to the controller 1.

1.3 Effects of Embodiment

According to the first embodiment, error correction results can be output for each sector in accordance with various types of reading schemes. The effects of this embodiment will be described below.

In a NAND flash memory, an error bit occurs (a bit is inverted) in part of written data. For this reason, when the NAND flash memory is used, error correction of data is performed by an ECC circuit.

The number of error-correctable bits has its own upper limit for each ECC circuit. On the other hand, in the NAND flash memory, with an increase in the number of times of reading operations with respect to once written data, the number of error bits tends to increase in the data.

For this reason, before an increase in the number of error bits makes it difficult for each ECC circuit to perform error correction, the controller executes processing such as moving data to another block. This processing is also called refresh processing.

On the other hand, NAND flash memories use various types of reading schemes such as the multi-plane reading operation, cache reading operation, and multi-plane reading operation with data cache. These reading schemes can improve the throughput of the reading of data by causing various types of circuits to concurrently operate.

In such a reading scheme accompanied by concurrent operations, however, when each ECC circuit is operated in the same manner as a usual reading scheme without being accompanied by concurrent operations, error correction results may not be output for the respective read data.

When performing a multi-plane reading operation, the semiconductor storage device according to the first embodiment outputs the output data DAT-P0 corresponding to the data read from the memory cell array 21-0 and the output data DAT-P1 corresponding to the data read from the memory cell array 21-1. The ECC circuit 18 transfers the error correction result STS-P0 on the output data DAT-P0 and the error correction result STS-P1 on the output data DAT-P1 to the status register 15. This makes it possible for the status register 15 to individually hold the error correction results STS-P0 and STS-P1.

The sequencer 16 outputs the error correction result STS-P0 from the status register 15 upon receiving command "7Ah" from the controller 1, and outputs the error correction result STS-P1 from the status register 15 upon receiving command "7Bh". This allows the controller 1 to grasp how many error bits have occurred at which sector positions concerning the respective data concurrently read from the different planes PB0 and PB1 in a multi-plane reading operation. This allows the controller 1 to determine the necessity of a refresh operation even in a multi-plane reading operation.

In addition, when performing a cache reading operation, the semiconductor storage device according to the first embodiment outputs the output data DAT-(n) corresponding to the data read at the nth reading operation concurrently with the (n+1)th reading operation from the memory cell array 21. The ECC circuit 18 individually transfers the error correction result STS-(n) on the output data DAT(n) and the error correction result STS-(n+1) on the data read at the (n+1)th reading operation to the status register 15. This allows the status register 15 to individually hold the error correction results STS-(n) and STS-(n+1).

The sequencer 16 outputs the error correction result STS-(odd) from the status register 15 upon receiving command "7Ch" from the controller 1, and outputs the error correction result STS-(even) from the status register 15 upon receiving command "7Dh". This allows the controller 1 to grasp how many error bits have occurred at which sector positions concerning the respective data for which reading from the memory cell array 21 and the outputting of data to the controller 1 have been concurrently executed by a cache reading operation. This allows the controller 1 to determine the necessity of a refresh operation even in a cache reading operation.

In addition, when performing a multi-plane reading operation with data cache, the semiconductor storage device according to the first embodiment outputs the output data DAT-P0 (n) and DAT-P1 (n) corresponding to the data read by multi-plane reading at the nth reading operation concurrently with the (n+1)th multi-plane reading operation from the memory cell arrays 21-0 and 21-1. The ECC circuit 18 individually transfers, to the status register 15, the error correction results STS-P0 (n) and STS-P1 (n) on the output data DAT-P0 (n) and DAT-P1 (n) and the error correction result STS-P0 (n+1) and STS-P1 (n+1) on the data read at the (n+1)th reading operation. This allows the status register 15 to individually hold the error correction results STS-P0 (n), STS-P1 (n), STS-P0 (n+1), and STS-P1 (n+1).

The sequencer 16 outputs the error correction results STS-P0 (odd) and STS-P1 (odd) from the status register 15 upon receiving command "7Eh" from the controller 1, and outputs the error correction result STS-P0 (even) and STS-P1 (even) from the status register 15 upon receiving command "7Fh". This allows the controller 1 to grasp how many error bits have occurred at which sector positions concerning the respective data for which reading from the memory cell array 21 and the outputting of data to the controller 1 have been concurrently executed by a cache reading operation. This allows the controller 1 to determine the necessity of a refresh operation even in a multi-plane reading operation with data cache.

In addition, the controller 1 instructs the semiconductor storage device 2 to output the error correction result STS before instructing to output the output data DAT in each of a multi-plane reading operation, cache reading operation, and multi-plane reading operation with data cache. This allows the controller 1 to determine, before a data output operation, whether error correction has succeeded for the output data DAT. Even if, therefore, error correction has failed for the output data DAT, the controller 1 can stop outputting the output data DAT. This can reduce the load on the controller 1.

1.4 First Modification of First Embodiment

Note that the first embodiment has exemplified the case of using command "7xh" dedicated to making the controller 1 output the error correction results STS. However, this is not exhaustive. The error correction result STS may be read from, for example, a feature table separately held in the status register 15. That is, the controller 1 may output the error correction result STS by using read command "0Fh" for the feature table.

A description of the same portions as those in the first embodiment will be omitted, and only different portions will be described below.

1.4.1 Error Correction Information Output Operation

Figure 12:
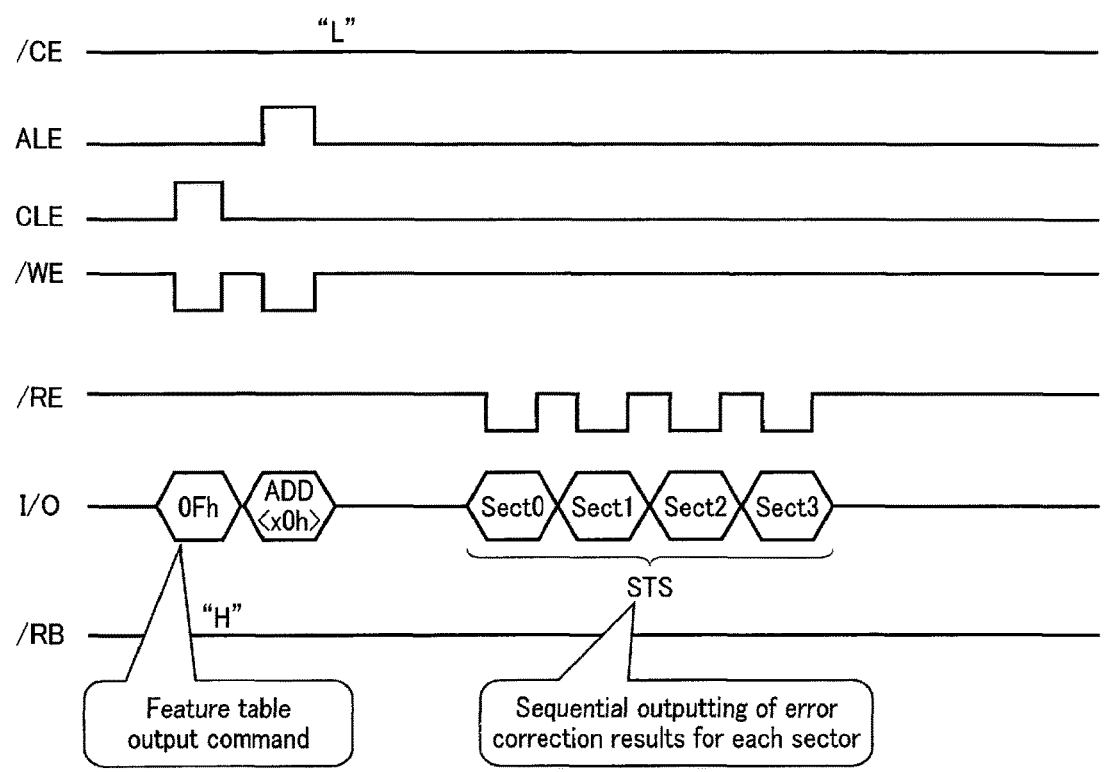
FIG. 12 is a command sequence for describing the error correction result output operation of the semiconductor storage device according to a first modification of the first embodiment.

An error correction result output operation will be described first. FIG. 12 is a command sequence for describing the error correction result output operation of the semiconductor storage device according to the first modification of the first embodiment. FIG. 12 corresponds to FIG. 5.

As shown in FIG. 12, the controller 1 issues command "0Fh" and address "x0h". Command "0Fh" is a generic term of commands for instructing to output information held in the feature table in the status register 15. Addresses "x0h" correspond to the storage destinations of various types of information in the feature table. For example, one address is assigned to 8-bit information. When command "0Fh" is stored in the command register 14, the sequencer 16 specifies information in the feature table which corresponds to address "x0h". The sequencer 16 then transfers the specified information from the status register 15 to the input/output control circuit 11.

Note that the feature table can hold the error correction results STS corresponding to a plurality of pages (for example, at least four pages). The error correction result STS corresponding to one sector is defined as, for example, 8-bit information including sector position information indicating a sector position and error bit count information indicating an error bit count and correction success/failure information. For this reason, one address "x0h" includes an address corresponding to the error correction result STS corresponding to one sector in the feature table. Address "x0h" corresponding to the error correction result STS corresponding to one sector includes, for example, "A0h", "B0h", "C0h", "D0h", "10h", "20h", "30h", and "40h". Each address will be described in detail later.

Upon receiving address "x0h" corresponding to the error correction result STS on a given sector (for example, sector 0) in a given page, the sequencer 16 causes the semiconductor storage device 2 to sequentially output data Sect0 including the error correction result STS together with data (Sect1 to Sect3) including the error correction results STS on other sectors (for example, sector 1 to sector 3) in the given page.

That is, when command "0Fh" and one address "x0h" are issued, the semiconductor storage device 2 sequentially outputs the error correction results STS corresponding to 1-page data for each sector throughout four cycles.

1.4.2 Multi-Plane Reading Operation

A multi-plane reading operation will be described next.

FIG. 13 is a feature table used for the multi-plane reading operation of the semiconductor storage device according to the first modification of the first embodiment.

As shown in FIG. 13, the feature table used for a multi-plane reading operation includes areas for identifying the respective error correction results STS on the data read from the different planes PB, with addresses being assigned to the respective areas. More specifically, the error correction results STS-P0 and STS-P1 are respectively associated with addresses "A0h" and "B0h".

That is, when command "0Fh" and address "A0h" are issued, the sequencer 16 outputs the error correction results STS-P0 corresponding to one page for each sector throughout four cycles. When command "0Fh" and address "B0h" are issued, the sequencer 16 outputs the error correction results STS-P1 corresponding to one page for each sector throughout four cycles.

More specifically, the error correction result STS-P0 corresponding to one sector holds sector position information SA (SA_0 to SA_3) at the first bit (bit 0) to the fourth bit (bit 3), and error bit count information and correction success/failure information BFA (BFA_0 to BFA_3) at the fifth bit (bit 4) to the eighth bit (bit 7). The error correction result STS-P1 corresponding to one sector holds sector position information SB (SB_0 to SB_3) at the first bit to the fourth bit, and error bit count information BFB (BFB_0 to BFB_3) at the fifth bit to the eighth bit.

Figure 14:
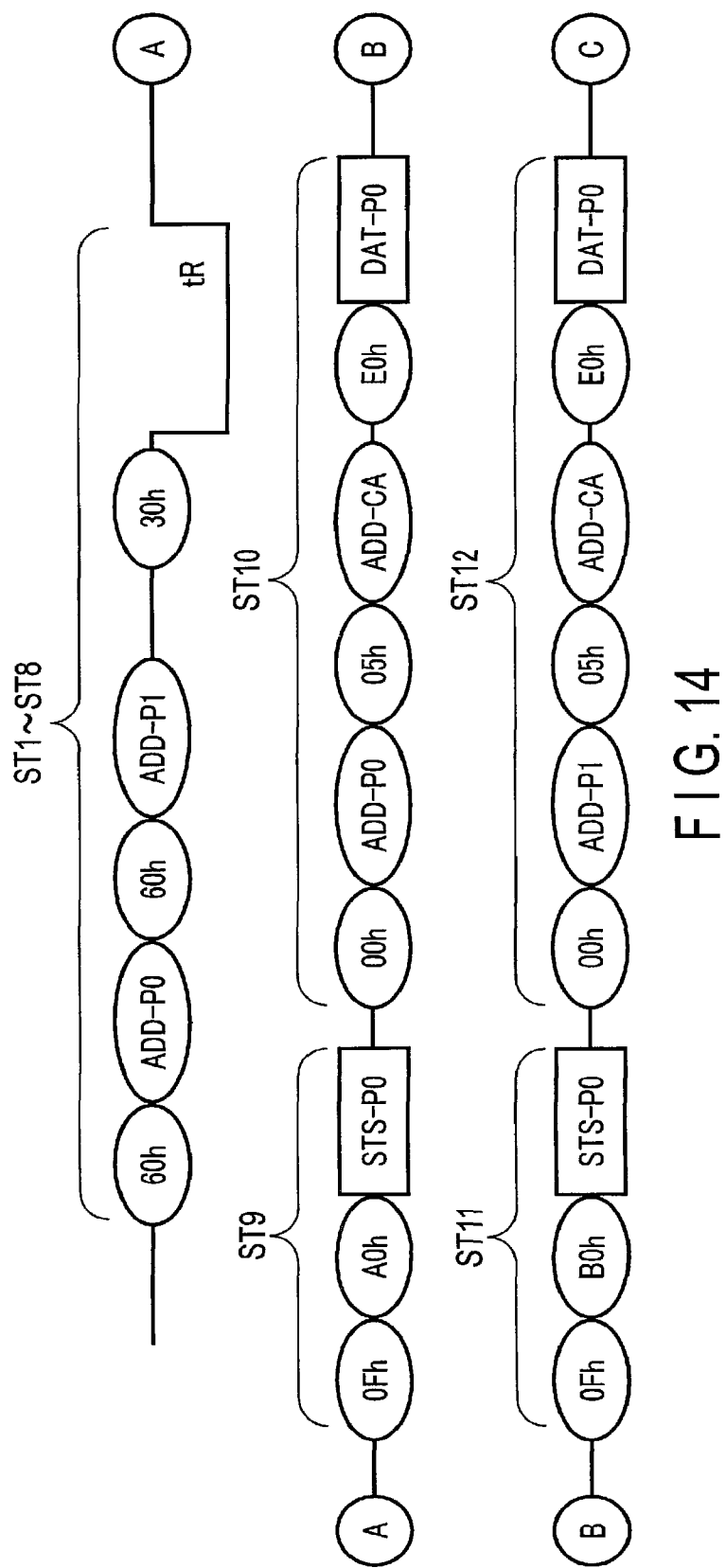
FIG. 14 is a command sequence for describing the multi-plane reading operation of the semiconductor storage device according to the first modification of the first embodiment.

FIG. 14 is a command sequence for describing the multi-plane reading operation of the semiconductor storage device according to the first modification of the first embodiment. FIG. 14 corresponds to FIG. 7 in the first embodiment.

As shown FIG. 14, the multi-plane reading operation in the first modification of the first embodiment differs from that in the first embodiment only in that feature read command "0Fh" and address "x0h" are used in place of dedicated command "7xh".

The controller 1 confirms that the signal /RB is at "H" level, upon completing the concurrent reading of data from the memory cell arrays 21-0 and 21-1, and then transmits command "0Fh" and address "A0h" to the semiconductor storage device 2.

Upon receiving command "0Fh" and address "A0h", the semiconductor storage device 2 executes step ST9 shown in FIG. 6. That is, the sequencer 16 outputs the error correction results STS-P0 corresponding to one page, held in the feature table in the status register 15, to the controller 1.

Based on the error correction results STS-P0, the controller 1 confirms that the data read from the plane PB0 has normally undergone error correction, and then transmits command "00h", address "ADD-P0", command "05h", address "ADD-CA", and command "E0h" to the semiconductor storage device 2. Upon receiving command "E0h", the semiconductor storage device 2 executes step ST10 shown in FIG. 6. That is, the sequencer 16 outputs the post-error correction data held in the register A2 as the output data DAT-P0 to the controller 1.

In addition, the controller 1 transmits command "0Fh" and address "B0h" to the semiconductor storage device 2. Upon receiving command "0Fh" and address "B0h", the semiconductor storage device 2 executes step ST11 shown in FIG. 6. That is, the sequencer 16 outputs the error correction results STS-P1 corresponding to one page, held in the feature table in the status register 15, to the controller 1.

Based on the error correction results STS-P1, the controller 1 confirms that the data read from the plane PB1 has normally undergone error correction, and then transmits command "00h", address "ADD-P1", command "05h", address "ADD-CA", and command "E0h" to the semiconductor storage device 2. Upon receiving command "E0h", the semiconductor storage device 2 executes step ST12 shown in FIG. 6. That is, the sequencer 16 outputs the post-error correction data held in the register A2 as the output data DAT-P1 to the controller 1.

This is the end of the multi-plane reading operation.

1.4.3 Cache Reading Operation

A cache reading operation will be described next.

FIG. 15 is a feature table used for the cache reading operation of the semiconductor storage device according to the first modification of the first embodiment.

As shown in FIG. 15, the feature table used for a cache reading operation includes areas for identifying the error correction results STS on the data read at the odd-number-th and even-number-th reading operations, with addresses being assigned to the respective areas. More specifically, the error correction results STS-(odd) and STS-(even) are respectively associated with addresses "C0h" and "D0h".

That is, when command "0Fh" and address "C0h" are issued, the sequencer 16 outputs the error correction results STS-(odd) corresponding to one page for each sector throughout four cycles. When command "0Fh" and address "D0h" are issued, the sequencer 16 outputs the error correction results STS-(even) corresponding to one page for each sector throughout four cycles.

More specifically, the error correction result STS-(odd) corresponding to one sector holds sector position information SC (SC_0 to SC_3) at the first bit to the fourth bit, and error bit count information BFC (BFC_0 to BFC_3) at the fifth bit to the eighth bit. The error correction result STS-(even) corresponding to one sector holds sector position information SD (SD_0 to SD_3) at the first bit to the fourth bit, and error bit count information BFD (BFD_0 to BFD_3) at the fifth bit to the eighth bit.

Figure 16:
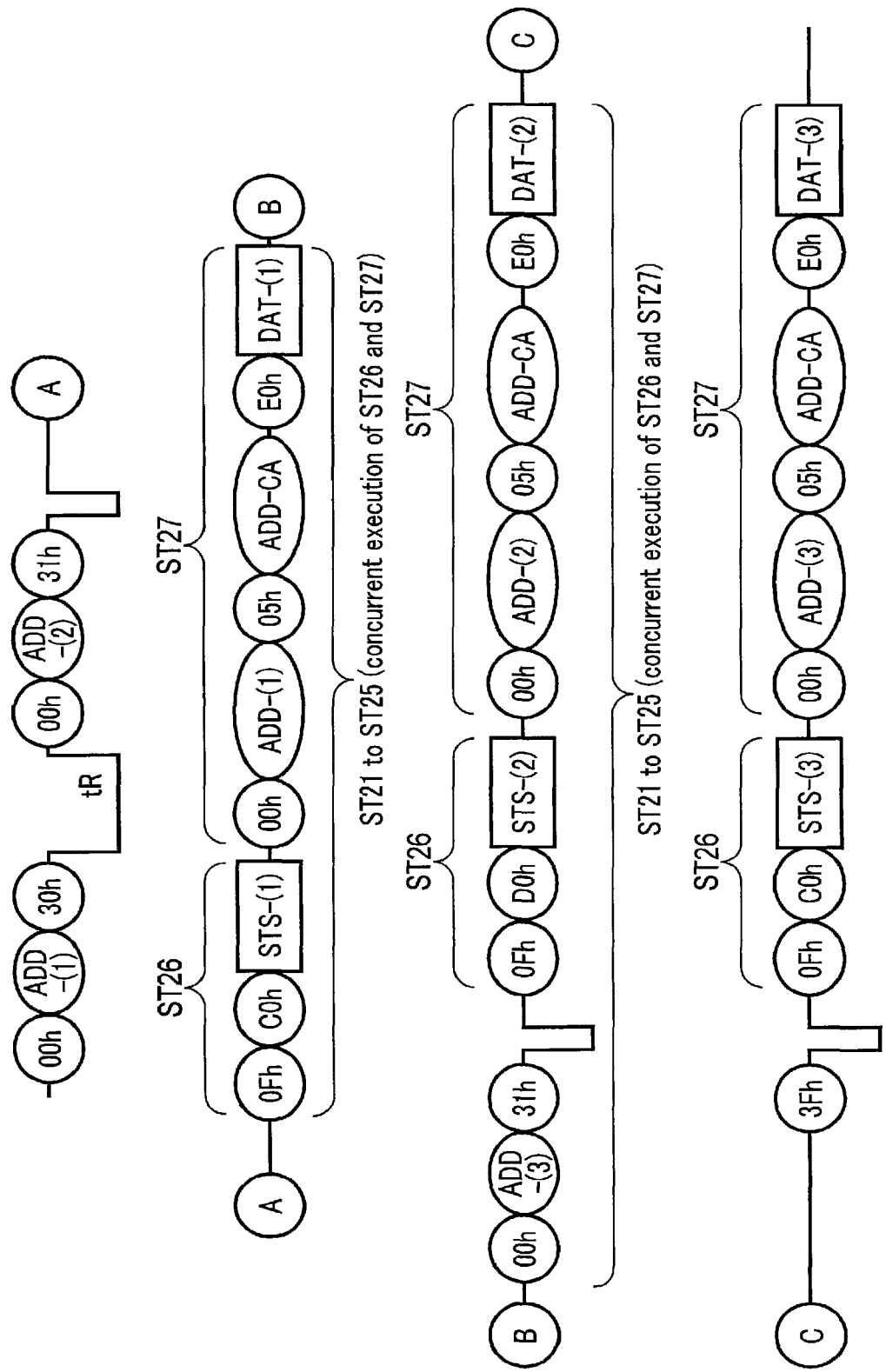
FIG. 16 is a command sequence for describing the cache reading operation of the semiconductor storage device according to the first modification of the first embodiment.

FIG. 16 is a command sequence for describing the cache reading operation of the semiconductor storage device according to the first modification of the first embodiment. FIG. 16 corresponds to FIG. 9 in the first embodiment.

As shown FIG. 16, like the multi-plane reading operation, the cache reading operation in the first modification of the first embodiment differs from that in the first embodiment only in that feature read command "0Fh" and address "x0h" are used in place of dedicated command "7xh".

The controller 1 confirms that the signal /RB is at "H" level, upon transmitting command "31h" for instructing the first data reading operation to the semiconductor storage device 2, and then transmits command "0Fh" and address "C0h" to the semiconductor storage device 2.

Upon receiving command "0Fh" and address "C0h", the semiconductor storage device 2 executes step ST26 shown in FIG. 8. That is, the sequencer 16 outputs the error correction result STS-(1) held in the feature table in the status register 15 to the controller 1. The sequencer 16 executes this operation concurrently with steps ST21 to ST25.

The controller 1 confirms that the signal /RB is at "H" level, upon transmitting command "31h" for instructing the second data reading operation to the semiconductor storage device 2, and then transmits command "0Fh" and address "D0h" to the semiconductor storage device 2.

Upon receiving command "0Fh" and address "D0h", the semiconductor storage device 2 executes step ST26 shown in FIG. 8. That is, the sequencer 16 outputs the error correction result STS-(2) held in the feature table in the status register 15 to the controller 1. The sequencer 16 executes this operation concurrently with steps ST21 to ST25.

In addition, the controller 1 confirms that the signal /RB is at "H" level, upon transmitting command "3Fh" for instructing not to perform any new data reading operation to the semiconductor storage device 2, and then transmits command "0Fh" and address "C0h" to the semiconductor storage device 2.

Upon receiving command "0Fh" and address "C0h", the semiconductor storage device 2 executes step ST26 shown in FIG. 8. That is, the sequencer 16 outputs the error correction result STS-(3) held in the feature table in the status register 15 to the controller 1.

This is the end of the cache reading operation.

1.4.4 Multi-Plane Reading Operation with Data Cache

A multi-plane reading operation with data cache will be described next.

FIG. 17 is a feature table used for the multi-plane reading operation with data cache of the semiconductor storage device according to the first modification of the first embodiment.

As shown in FIG. 17, the feature table used for a multi-plane reading operation with data cache includes areas for identifying the error correction results STS on four types of data, with addresses being assigned to the respective areas. The four types of data are classified according to whether the data are read from the plane PB0 or PB1 and at the even-number-th or odd-number-th reading operation from the same plane PB. More specifically, an error correction result STS-P0 (odd) is associated with address "10h", and an error correction result STS-P0 (even) is associated with address "20h". In addition, an error correction result STS-P1 (odd) is associated with address "30h", and an error correction result STS-P1 (even) is associated with address "40h".

That is, when command "0Fh" and address "10h" are issued, the sequencer 16 outputs the error correction results STS-P0 (odd) corresponding to one page for each sector throughout four cycles. When command "0Fh" and address "20h" are issued, the sequencer 16 outputs the error correction results STS-P0 (even) corresponding to one page for each sector throughout four cycles. When command "0Fh" and address "30h" are issued, the sequencer 16 outputs the error correction results STS-P1 (odd) corresponding to one page for each sector throughout four cycles. When command "0Fh" and address "40h" are issued, the sequencer 16 outputs the error correction results STS-P1 (even) corresponding to one page for each sector throughout four cycles.

More specifically, the error correction result STS-P0 (odd) corresponding to one sector holds sector position information S1 (S1_0 to S1_3) at the first bit to the fourth bit, and error bit count information BF1 (BF1_0 to BF1_3) at the fifth bit to the eighth bit. The error correction result STS-P0 (even) corresponding to one sector holds sector position information S2 (S2_0 to S2_3) at the first bit to the fourth bit, and error bit count information BF2 (BF2_0 to BF2_3) at the fifth bit to the eighth bit. The error correction result STS-P1 (odd) corresponding to one sector holds sector position information S3 (S3_0 to S3_3) at the first bit to the fourth bit, and error bit count information BF3 (BF3_0 to BF3_3) at the fifth bit to the eighth bit. The error correction result STS-P1 (even) corresponding to one sector holds sector position information S4 (S4_0 to S4_3) at the first bit to the fourth bit, and error bit count information BF4 (BF4_0 to BF4_3) at the fifth bit to the eighth bit.

Figure 18:
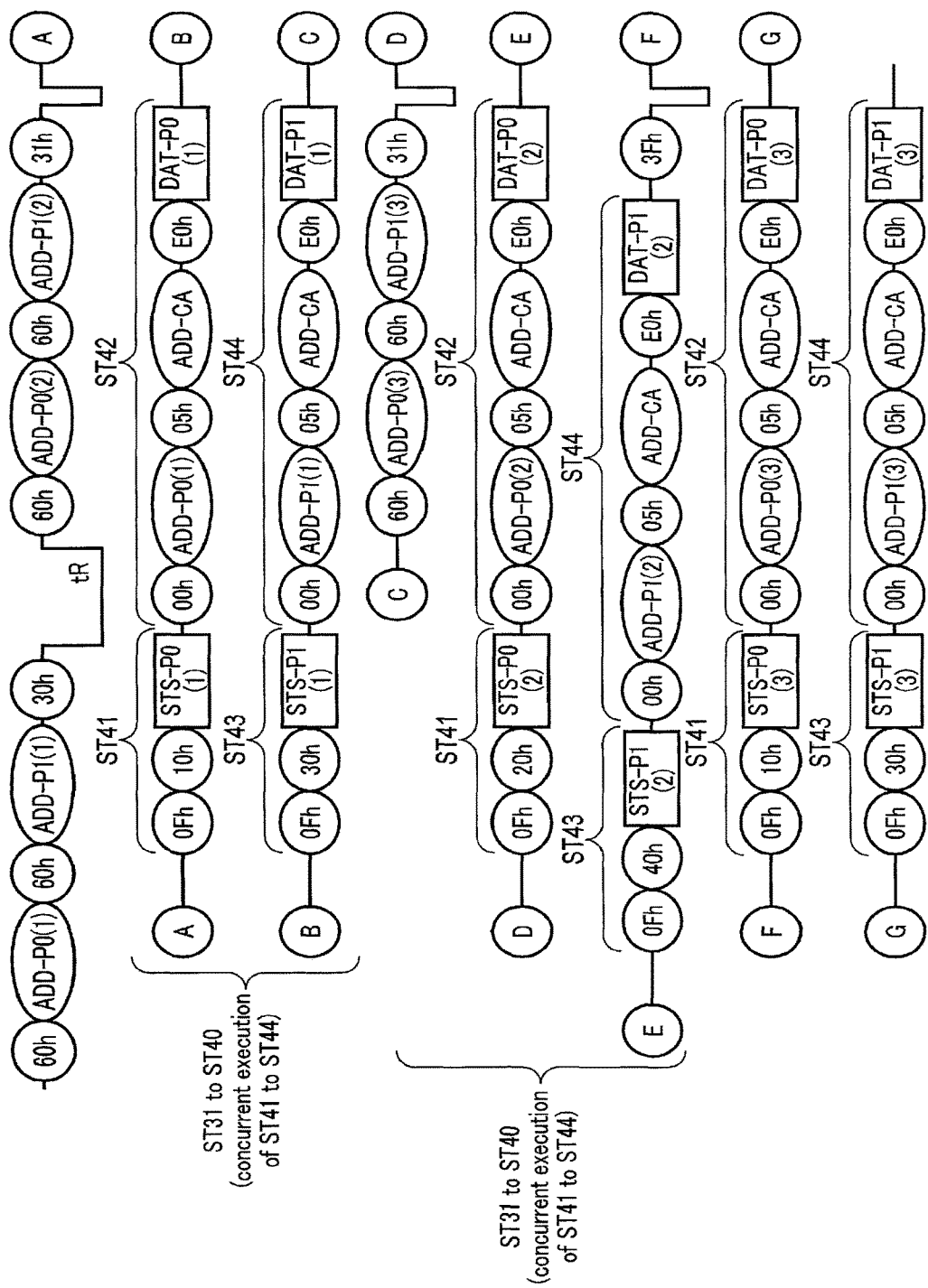
FIG. 18 is a command sequence for describing the multi-plane reading operation with data cache of the semiconductor storage device according to the first modification of the first embodiment.

FIG. 18 is a command sequence for describing the multi-plane reading operation with data cache of the semiconductor storage device according to the first modification of the first embodiment. FIG. 18 corresponds to FIG. 11 in the first embodiment.

As shown FIG. 18, like a multi-plane reading operation and a cache reading operation, a multi-plane reading operation with data cache according to the first modification of the first embodiment differs from that according to the first embodiment only in that feature read command "0Fh" and address "x0h" are used in place of dedicated command "7xh".

The controller 1 confirms that the signal /RB is at "H" level, upon transmitting command "31h" for instructing the second data reading operation to the semiconductor storage device 2, and then transmits command "0Fh" and address "10h" to the semiconductor storage device 2.

Upon receiving command "0Fh" and address "10h", the semiconductor storage device 2 executes step ST41 shown in FIG. 10. That is, the sequencer 16 outputs the error correction result STS-P0(1) held in the feature table in the status register 15 to the controller 1.

Upon completing the outputting of the output data DAT-P0(1) from the semiconductor storage device 2, the controller 1 transmits command "0Fh" and address "30h" to the semiconductor storage device 2. Upon receiving command "0Fh" and address "30h", the semiconductor storage device 2 executes step ST43 shown in FIG. 10. That is, the sequencer 16 outputs the error correction result STS-P1(1) held in the feature table in the status register 15 to the controller 1.

The operation in steps ST41 to ST44 associated with the first output operation is executed concurrently with in steps ST31 to ST40 associated with the second reading operation.

The controller 1 confirms that the signal /RB is at "H" level, upon transmitting command "31h" for instructing the third data reading operation to the semiconductor storage device 2, and then transmits command "0Fh" and address "20h" to the semiconductor storage device 2.

Upon receiving command "0Fh" and address "20h", the semiconductor storage device 2 executes step ST41 shown in FIG. 10. That is, the sequencer 16 outputs the error correction result STS-P0(2) held in the feature table in the status register 15 to the controller 1.

Upon completing the outputting of the output data DAT-P0(2) from the semiconductor storage device 2, the controller 1 transmits command "0Fh" and address "40h" to the semiconductor storage device 2. Upon receiving command "0Fh" and address "40h", the semiconductor storage device 2 executes step ST43 shown in FIG. 10. That is, the sequencer 16 outputs the error correction result STS-P1(2) held in the feature table in the status register 15 to the controller 1.

The operation in steps ST41 to ST44 associated with the second output operation is executed concurrently with steps ST31 to ST40 associated with the third reading operation.

In addition, the controller 1 confirms that the signal /RB is at "H" level, upon transmitting command "3Fh" for instructing not to perform any new data reading operation to the semiconductor storage device 2, and then transmits command "0Fh" and address "10h" to the semiconductor storage device 2.

Upon receiving command "0Fh" and address "10h", the semiconductor storage device 2 executes step ST41 shown in FIG. 10. That is, the sequencer 16 outputs the error correction result STS-(3) held in the feature table in the status register 15 to the controller 1.

In addition, upon completing the outputting of the output data DAT-P0(3) from the semiconductor storage device 2, the controller 1 transmits command "0Fh" and address "30h" to the semiconductor storage device 2. Upon receiving command "0Fh" and address "30h", the semiconductor storage device 2 executes step ST43 shown in FIG. 10. That is, the sequencer 16 outputs the error correction result STS-P0(3) held in the feature table in the status register 15 to the controller 1.

This is the end of the multi-plane reading operation with data cache.

1.4.5 Effects of First Modification

According to the first modification of the first embodiment, the status register 15 holds the error correction results STS in the feature table. The semiconductor storage device 2 outputs the error correction results STS in the feature table to obtain the same effects as those of the first embodiment.

More specifically, upon receiving feature table output command "0Fh" and address "x0h", the sequencer 16 consecutively outputs the error correction result STS on a sector corresponding to address "x0h" and the error correction result STS on another sector in the same page to which the above sector belongs. This allows the controller 1 to obtain the error correction results STS corresponding to one page every time issuing command "0Fh".

In addition, in a multi-plane reading operation, the two error correction results STS-P0 and STS-P1 are assigned to the feature table so as be identifiable. That is, addresses "A0h" and "B0h" are respectively assigned to the error correction results STS-P0 and STS-P1. This makes it possible to determine the necessity of a refresh operation in a multi-plane reading operation without using any dedicated commands for outputting the error correction results STS.

Furthermore, in a cache reading operation, the two error correction results STS-(odd) and STS-(even) are assigned to the feature table so as be identifiable. That is, addresses "C0h" and "D0h" are respectively assigned to the error correction results STS-(odd) and STS-(even). This makes it possible to determine the necessity of a refresh operation in a cache reading operation without using any dedicated commands for outputting the error correction results STS.

Moreover, in a multi-plane reading operation with data cache, the four error correction results STS-P0 (odd), STS-P0 (even), STS-P1 (odd), and STS-P1 (even), are assigned to the feature table so as be identifiable. That is, addresses "10h", "20h", "30h", and "40h" are respectively assigned to the error correction results STS-P0 (odd), STS-P0 (even), STS-P1 (odd), and STS-P1 (even). This makes it possible to determine the necessity of a refresh operation in a multi-plane reading operation with data cache without using any dedicated commands for outputting the error correction results STS.

1.5 Second Modification of First Embodiment

The first modification of the first embodiment has exemplified the case in which when the controller 1 issues one address "x0h", the error correction results STS corresponding to one page are automatically output throughout four cycles. However, this is not exhaustive, and the error correction result STS corresponding to one sector may be output with respect to one address "x0h".

Figure 19:
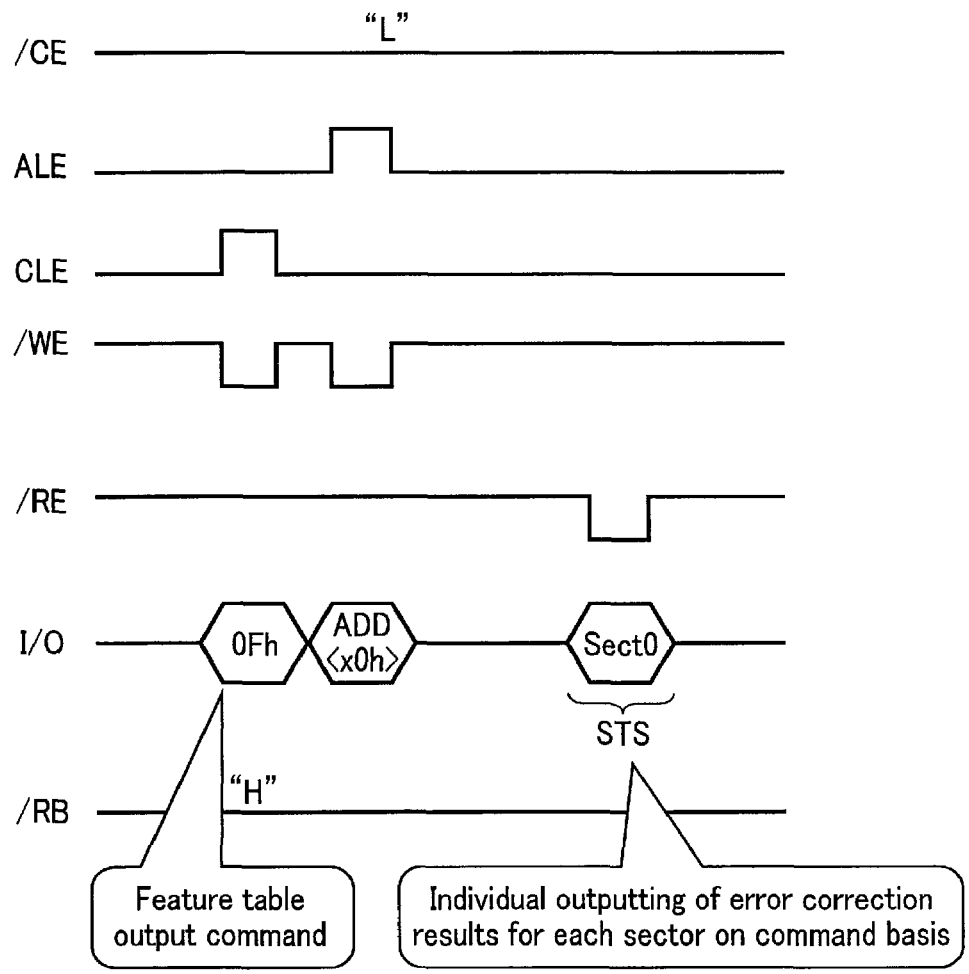
FIG. 19 is a command sequence for describing the error correction result output operation of the semiconductor storage device according to a second modification of the first embodiment.

FIG. 19 is a command sequence for describing the error correction result output operation of the semiconductor storage device according to the second modification of the first embodiment. FIG. 19 corresponds to part of FIG. 12.

As shown in FIG. 19, the controller 1 issues command "0Fh" and address "x0h". When command "0Fh" is stored in the command register 14, the sequencer 16 specifies that information in the feature table which corresponds to address "x0h". The sequencer 16 then transfers the specified information from the status register 15 to the input/output control circuit 11.

Note that upon receiving address "x0h" corresponding to the error correction result STS on a given sector (for example, sector 0) in a given page, the sequencer 16 causes the semiconductor storage device 2 to output only data Sect0 including the error correction result STS on the given sector.

That is, when the controller 1 issues command "0Fh" and address "x0h", the semiconductor storage device 2 individually outputs only the error correction result STS corresponding to 1-sector data throughout one cycle.

When the error correction result STS is output in the above manner, address "x0h" is assigned for each sector. FIG. 20 is a feature table used for the reading operation of the semiconductor storage device according to the second modification of the first embodiment. The following will describe a case in which the feature table shown in FIG. 20 is used for a multi-plane reading operation with data cache.

As shown in FIG. 20, according to the second modification of the first embodiment, addresses "x0h" include addresses "A1h", "A2h", "A3h", "B1h", "B2h", "B3h", "C1h", "C2h", "C3h", "D1h", "D2h", and "D3h" in addition to "A0h", "B0h", "C0h", and "D0h".

The error correction result STS corresponding to one sector can hold arbitrary data at the first to third bits, and holds plane information at the fourth bit and error bit information at the fifth to eighth bits. For example, when read data corresponding to the error correction result STS corresponds to the plane PB0, "0" is input as plane information, whereas when the read data corresponds to the plane PB1, "1" is input as plane information.

More specifically, portions corresponding to sector 0 to sector 3 of the error correction result STS-P0 (odd) are respectively associated with addresses "A0h", "A1h", "A2h", and "A3h". Pieces of error bit count information BFA0 (BFA0_0 to BFA0_3) to BFA3 (BFA3_0 to BFA3_3) of sector 0 to sector 3 are held at the fifth to eighth bits of the error correction results STS-P0 (odd) associated with addresses "A0h" to "A3h".

Portions corresponding to sector 0 to sector 3 of the error correction result STS-P1 (odd) are respectively associated with addresses "B0h", "B1h", "B2h", and "B3h". Pieces of error bit count information BFB0 (BFB0_0 to BFB0_3) to BFB3 (BFB3_0 to BFB3_3) of sector 0 to sector 3 are held at the fifth to eighth bits of the error correction results STS-P1 (odd) associated with addresses "B0h" to "B3h".

Portions corresponding to sector 0 to sector 3 of the error correction result STS-P0 (even) are respectively associated with addresses "C0h", "C1h", "C2h", and "C3h". Pieces of error bit count information BFC0 (BFC0_0 to BFC0_3) to BFC3 (BFC3_0 to BFC3_3) of sector 0 to sector 3 are held at the fifth to eighth bits of the error correction results STS-P0 (even) associated with addresses "C0h" to "C3h".

Portions corresponding to sector 0 to sector 3 of the error correction result STS-P1 (even) are respectively associated with addresses "D0h", "D1h", "D2h", and "D3h". Pieces of error bit count information BFD0 (BFD0_0 to BFD0_3) to BFD3 (BFD3_0 to BFD3_3) of sector 0 to sector 3 are held at the fifth to eighth bits of the error correction results STS-P1 (even) associated with addresses "D0h" to "D3h".

Note that in the case described above, the feature table shown in FIG. 20 is used for a multi-plane reading operation with data cache. However, this is not exhaustive, and the feature table shown in FIG. 20 can also be used for a multi-plane reading operation and a cache reading operation.

When, for example, the feature table shown in FIG. 20 is used for a multi-plane reading operation, the error correction result STS-P0 is associated with addresses "A0h" to "A3h", and the error correction result STS-P1 is associated with addresses "B0h" to "B3h".

In addition, when, for example, the feature table shown in FIG. 20 is used for a cache reading operation in the plane PB0, the error correction result STS-P0 (odd) is associated with addresses "A0h" to "A3h", and the error correction result STS-P0 (even) is associated with addresses "C0h" to "C3h". Likewise, when, for example, the feature table shown in FIG. 20 is used for a cache reading operation in the plane PB1, the error correction result STS-P0 (odd) is associated with addresses "B0h" to "B3h", and the error correction result STS-P1 (even) is associated with addresses "D0h" to "D3h".

Assigning addresses in the above manner can specify all the sectors in all read data when performing a multi-plane reading operation, cache reading operation, and multi-plane reading operation with data cache. This allows the controller 1 to obtain the error correction result STS corresponding to one sector every time issuing command "0Fh".

2. Second Embodiment

The first embodiment has exemplified the semiconductor storage device connected to the controller or host device based on the NAND interface. The second embodiment will exemplify a semiconductor storage device connected to a controller or host device based on a serial interface complying with SPI (Serial Peripheral Interface). A description of the same portions as those in the first embodiment will be omitted, and only different portions will be described below.

2.1 Configuration

The configuration of a semiconductor storage device according to the second embodiment will be described.

2.1.1 Configuration of Semiconductor Storage Device

Figure 21:
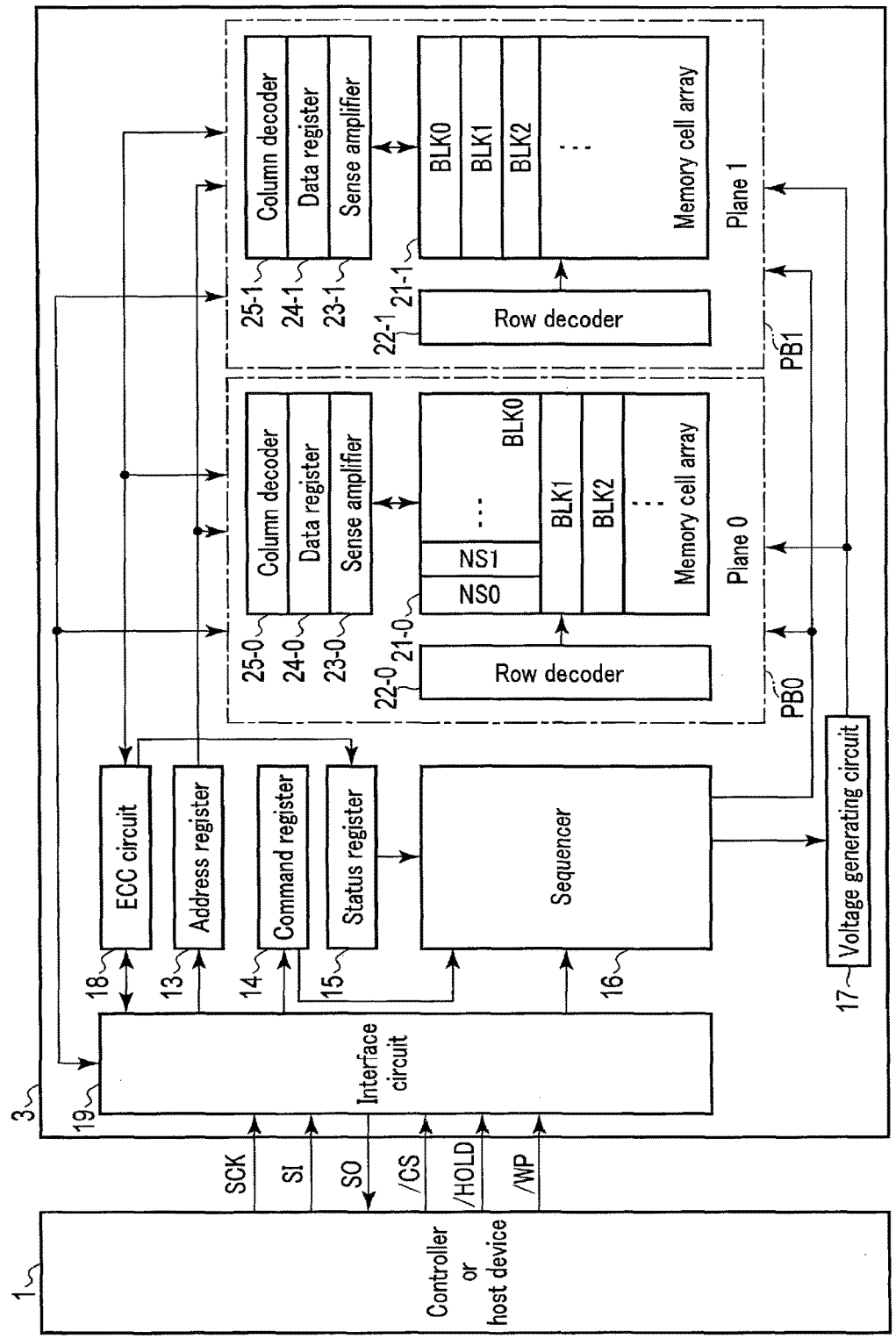
FIG. 21 is a block diagram for describing the configuration of a semiconductor storage device according to a second embodiment.

FIG. 21 is a block diagram for describing the configuration of the semiconductor storage device according to the second embodiment. FIG. 21 corresponds to FIG. 1. As shown in FIG. 21, a semiconductor storage device 3 is connected to an external controller or host device 1 (to be simply referred to as the host device 1 hereinafter in the second embodiment). The semiconductor storage device 3 includes an interface circuit 19 in place of the input/output control circuit 11 and the logic control circuit 12 in FIG. 1.

The interface circuit 19 receives signals SCK, SI, /CS, /HOLD, and /WP from the host device 1, and transmits a signal SO to the host device 1. The signal SCK is a serial clock signal. The signals SI and SO are serial data for input and output operations. The signal /CS is a chip select signal (in other words, a signal that is activated to access the semiconductor storage device 3) for activating the semiconductor storage device 3. The signal /CS is asserted (set at "L" level) at the timing when the host device 1 inputs a command to the semiconductor storage device 3. The signal /HOLD is asserted (set at "L" level) when communication between the host device 1 and the semiconductor storage device 3 is temporarily stopped. The signal /WP is asserted (set at "L" level) to inhibit part of the settings of the semiconductor storage device 3 from being changed.

2.2 Operation

The operation of the semiconductor storage device according to the second embodiment will be described next.

2.2.1 Error Correction Information Output Operation

Figure 22:
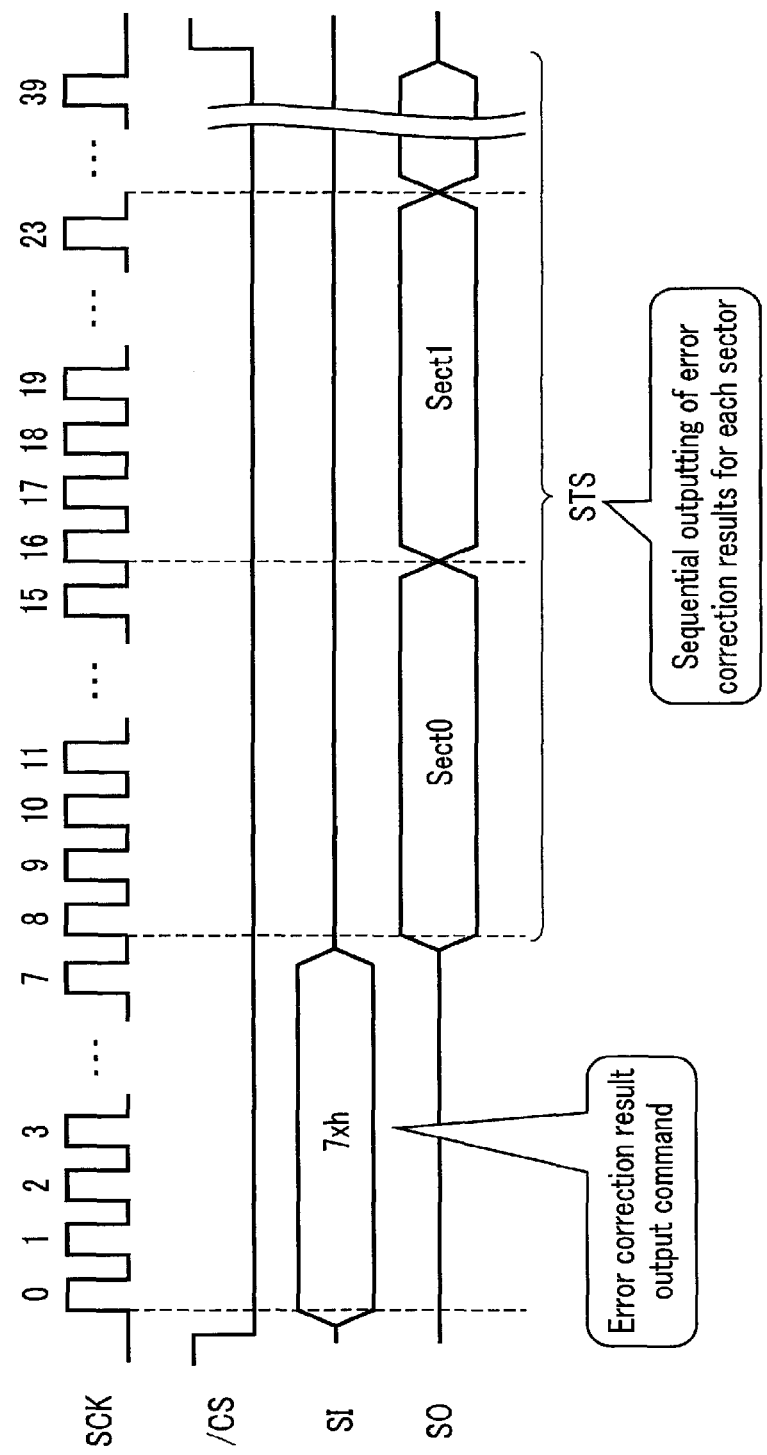
FIG. 22 is a command sequence for describing the error correction result output operation of the semiconductor storage device according to the second embodiment.

FIG. 22 is a command sequence for describing the error correction result output operation of the semiconductor storage device according to the second embodiment. FIG. 22 corresponds to FIG. 5.

As shown in FIG. 22, the host device 1 asserts the signal /CS and issues error correction result output command "7xh" as the signal SI. The host device 1 further issues the signal SCK.

The interface circuit 19 recognizes, as a command, the signal SI received when the first signal SCK is received after the signal /CS is asserted. This command is an 8-bit signal input throughout, for example, an 8-clock cycle. Upon receiving command "7xh", the semiconductor storage device 3 starts an output sequence for error correction results STS.

The semiconductor storage device 3 sequentially outputs the error correction results STS, each corresponding to one sector throughout an 8-clock cycle, to the host device 1 in the order of sector 0 to sector 3. After the semiconductor storage device 3 outputs the error correction results STS corresponding to one page, the host device 1 negates the signal /CS.

With the above operation, the semiconductor storage device 3 can output the error correction results STS similar to those in the first embodiment to the host device 1.

2.2.2 Multi-Plane Reading Operation

A multi-plane reading operation will be described next.

FIG. 23 is a command sequence for describing the multi-plane reading operation of the semiconductor storage device according to the second embodiment. FIG. 23 corresponds to FIG. 7, and shows an example of a command sequence for implementing the multi-plane reading operation shown in FIG. 6.

As shown in FIG. 23, the multi-plane reading operation according to the second embodiment differs from that according to the first embodiment in the portion associated with a reading operation from the memory cell array 21 and the portion associated with an output operation to the host device 1. On the other hand, the portion associated with an error correction result output operation according to the second embodiment is the same as that according to the first embodiment.

More specifically, the host device 1 transmits command "60h", address "ADD-P0", command "60h", address "ADD-P1", and command "61h" to the semiconductor storage device 3 in the order named. Command "61h" is a command for instructing to read data corresponding to the address transmitted from the memory cell array 21 immediately before the command. That is, command "61h" is a command for instructing the semiconductor storage device 3 to concurrently read data from the memory cell arrays 21-0 and 21-1. In addition, command "61h" indicates that the semiconductor storage device 3 suspends read data without starting to output it to the host device 1, and a subsequent instruction is issued.

Upon receiving command "61h", the semiconductor storage device 3 sets, for example, OIP (Operation in Progress) in a feature table to "1" during a period tR. OIP in the feature table is a flag indicating whether the semiconductor storage device 3 is in a ready state or busy state, with "0" indicating a ready state and "1" indicating a busy state. The host device 1 may grasp the state of the semiconductor storage device 3 by issuing a command for obtaining OIP in the feature table to the semiconductor storage device 3 and obtaining OIP.

The operation of the semiconductor storage device 3 during the period tR is the same as that in the first embodiment, and hence a description of the operation will be omitted. Upon completing the concurrent reading of data from memory cell arrays 21-0 and 21-1, the semiconductor storage device 3 sets OIP to "0" to notify the host device 1 of a ready state.

Subsequently, the host device 1 transmits command "7Ah" to the semiconductor storage device 3. Upon receiving command "7Ah", the semiconductor storage device 3 executes step ST9 shown in FIG. 6. That is, a sequencer 16 outputs an error correction result STS-P0 held in a status register 15 to the host device 1.

Based on the error correction result STS-P0, the host device 1 confirms that the data read from a plane PB0 has normally undergone error correction, and then transmits command "03h" to the semiconductor storage device 3. Command "03h" corresponds to an address input accept command and is a command for instructing an operation for outputting data from the semiconductor storage device 3 to the host device 1. Subsequently, the host device 1 transmits address "ADD-P0-CA" to the semiconductor storage device 3. This makes the semiconductor storage device 3 recognize that an instruction is issued to output the data read from the plane PB0.

Upon receiving address "ADD-P0-CA", the semiconductor storage device 3 executes step ST10 shown in FIG. 6. That is, the sequencer 16 outputs the post-error correction data held in a register A2 as output data DAT-P0 to the host device 1.

Subsequently, the host device 1 transmits command "7Bh" to the semiconductor storage device 3. Upon receiving command "7Bh", the semiconductor storage device 3 executes step ST11 shown in FIG. 6. That is, the sequencer 16 outputs an error correction result STS-P1 held in the status register 15 to the host device 1.

Based on the error correction result STS-P1, the host device 1 confirms that the data read from a plane PB1 has normally undergone error correction, and then transmits command "03h" and address "ADD-P1-CA" to the semiconductor storage device 3. Upon receiving address "ADD-P1-CA", the semiconductor storage device 3 executes step ST12 shown in FIG. 6. That is, the sequencer 16 outputs the post-error correction data held in a register B2 as output data DAT-P1 to the host device 1.

With the above operation, the semiconductor storage device 3 can output the error correction results STS-P0 and STS-P1 to the host device 1 in the multi-plane reading operation based on the serial interface.

2.2.3 Cache Reading Operation

A cache reading operation will be described next.

Figure 24:
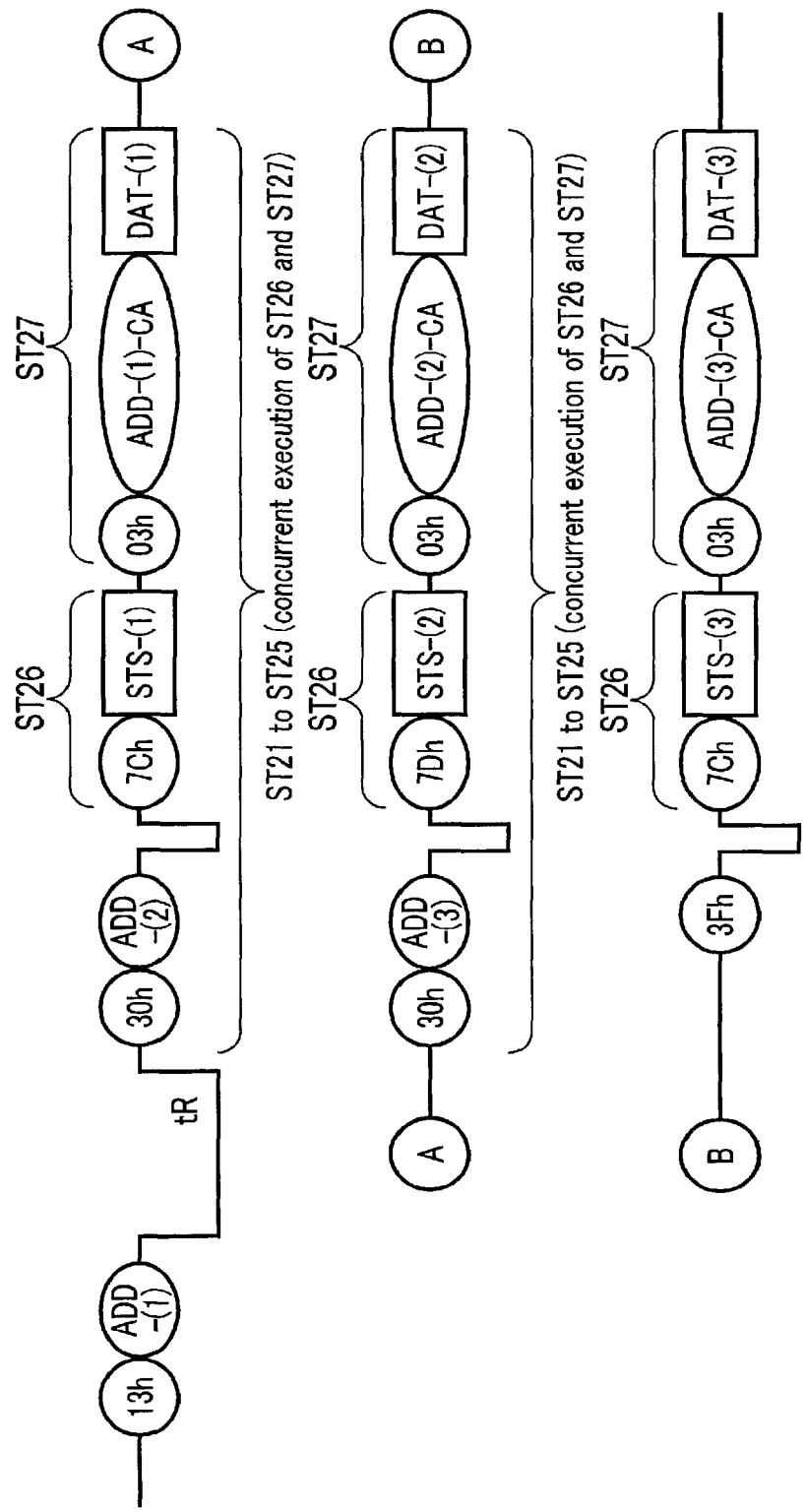
FIG. 24 is a command sequence for describing the cache reading operation of the semiconductor storage device according to the second embodiment.

FIG. 24 is a command sequence for describing the cache reading operation of the semiconductor storage device according to the second embodiment. FIG. 24 corresponds to FIG. 9, and shows an example of a command sequence for implementing the cache reading operation shown in FIG. 8.

As shown in FIG. 24, the cache reading operation according to the second embodiment differs from that according to the first embodiment in the portion associated with a reading operation from the memory cell array 21 and the portion associated with an output operation to the host device 1. On the other hand, the portion associated with an error correction result output operation according to the second embodiment is the same as that according to the first embodiment.

As shown in FIG. 24, the host device 1 transmits command "13h" and address "ADD-(1)" to the semiconductor storage device 3. Command "13h" corresponds to, for example, an address input accept command, and is a command for instructing an operation for outputting data from the semiconductor storage device 3 to the host device 1.

Upon receiving address "ADD-(1)", the semiconductor storage device 3 sets OIP in the feature table to "1" during the period tR to notify the host device 1 of a busy state. The operation of the semiconductor storage device 3 during the period tR is the same as that in the first embodiment, and hence a description of the operation will be omitted. Upon completing the reading of data from the memory cell array 21-0, the semiconductor storage device 3 sets OIP to "0" to notify the host device 1 of a ready state.

In this case, the state of the semiconductor storage device 3 coincides with the state immediately before step ST21 shown in FIG. 8.

Subsequently, the host device 1 transmits command "30h" and address "ADD-(2)" to the semiconductor storage device 3. Command "30h" is a command for instructing to read data corresponding to the address transmitted immediately after the command from the memory cell array 21. In addition, command "30h" is a command for instructing to temporarily hold the data read next. Note that the data read at the second reading operation is held without overwriting the data read at the first reading operation.

Upon receiving command "30h" and address "ADD-(2)", the semiconductor storage device 3 executes steps ST21 to ST25 shown in FIG. 8. That is, in step ST21, the sequencer 16 sets OIP to "1" to notify the host device 1 of a busy state while the data held in registers C1 and C2 are respectively transferred to a registers A1 and A2. Upon completing the data transfer between the registers, the semiconductor storage device 3 sets OIP to "0" to notify the host device 1 of a ready state. The details of other operations associated with steps ST21 to ST25 are the same as those in the first embodiment, and hence a description of the details will be omitted.

The host device 1 and the semiconductor storage device 3 execute steps ST26 and ST27 shown in FIG. 8 concurrently with steps ST21 to ST25.

More specifically, the host device 1 transmits command "7Ch" to the semiconductor storage device 3. Upon receiving command "7Ch", the semiconductor storage device 3 outputs, to the host device 1, the error correction result STS-(1), of the error correction results STS-(n) held in the status register 15, which corresponds the data read at the first reading operation.

Based on the error correction result STS-(1), the host device 1 confirms that the read data has normally undergone error correction. The host device 1 then transmits command "03h" and address "ADD-(1)-CA" to the semiconductor storage device 3.

Upon receiving address "ADD-(1)-CA", the semiconductor storage device 3 outputs the post-error correction data held in the register A2 as read data DAT-(1) to the host device 1.

In this case, the state of the semiconductor storage device 3 coincides again with the state immediately before step ST21 shown in FIG. 8.

Subsequently, the host device 1 transmits command "30h" and address "ADD-(3)" to the semiconductor storage device 3.

Upon receiving command "30h" and address "ADD-(3)", the semiconductor storage device 3 executes steps ST21 to ST25 shown in FIG. 8.

The host device 1 and the semiconductor storage device 3 execute steps ST26 and ST27 shown in FIG. 8 concurrently with steps ST21 to ST25.

More specifically, the host device 1 transmits command "7Dh" to the semiconductor storage device 3. Upon receiving command "7Dh", the semiconductor storage device 3 outputs, to the host device 1, the error correction result STS-(2), of the error correction results STS-(n) held in the status register 15, which corresponds to the data read at the second reading operation.

Based on the error correction result STS-(2), the host device 1 confirms that the read data has normally undergone error correction. The host device 1 transmits command "03h" and address "ADD-(2)-CA" to the semiconductor storage device 3.

Upon receiving address "ADD-(2)-CA", the semiconductor storage device 3 outputs the post-error correction data held in the register A2 as output data DAT-(2) to the host device 1.

Subsequently, the host device 1 transmits command "3Fh" to the semiconductor storage device 3. Upon receiving command "3Fh", the semiconductor storage device 3 outputs the data held in the registers C1 and C2 to the registers A1 and A2 to prepare for the outputting of the data.

The host device 1 transmits command "7Ch" to the semiconductor storage device 3. Upon receiving command "7Ch", the semiconductor storage device 3 outputs, to the host device 1, the error correction result STS-(3), of the error correction results STS-(n) held in the status register 15, which corresponds to the data read at the third reading operation.

Based on the error correction result STS-(3), the host device 1 confirms that the read data has normally undergone error correction. The host device 1 transmits command "03h" and address "ADD-(3)-CA" to the semiconductor storage device 3.

Upon receiving address "ADD-(3)-CA", the semiconductor storage device 3 outputs the post-error correction data held in the register A2 as output data DAT-(3) to the host device 1.

With the above operation, the semiconductor storage device 3 can individually output the error correction results STS corresponding to the respective data to the host device 1 even in the cache reading operation based on a serial interface.

2.2.4 Multi-Plane Reading Operation with Data Cache

A multi-plane reading operation with data cache will be described next.

Figure 25:
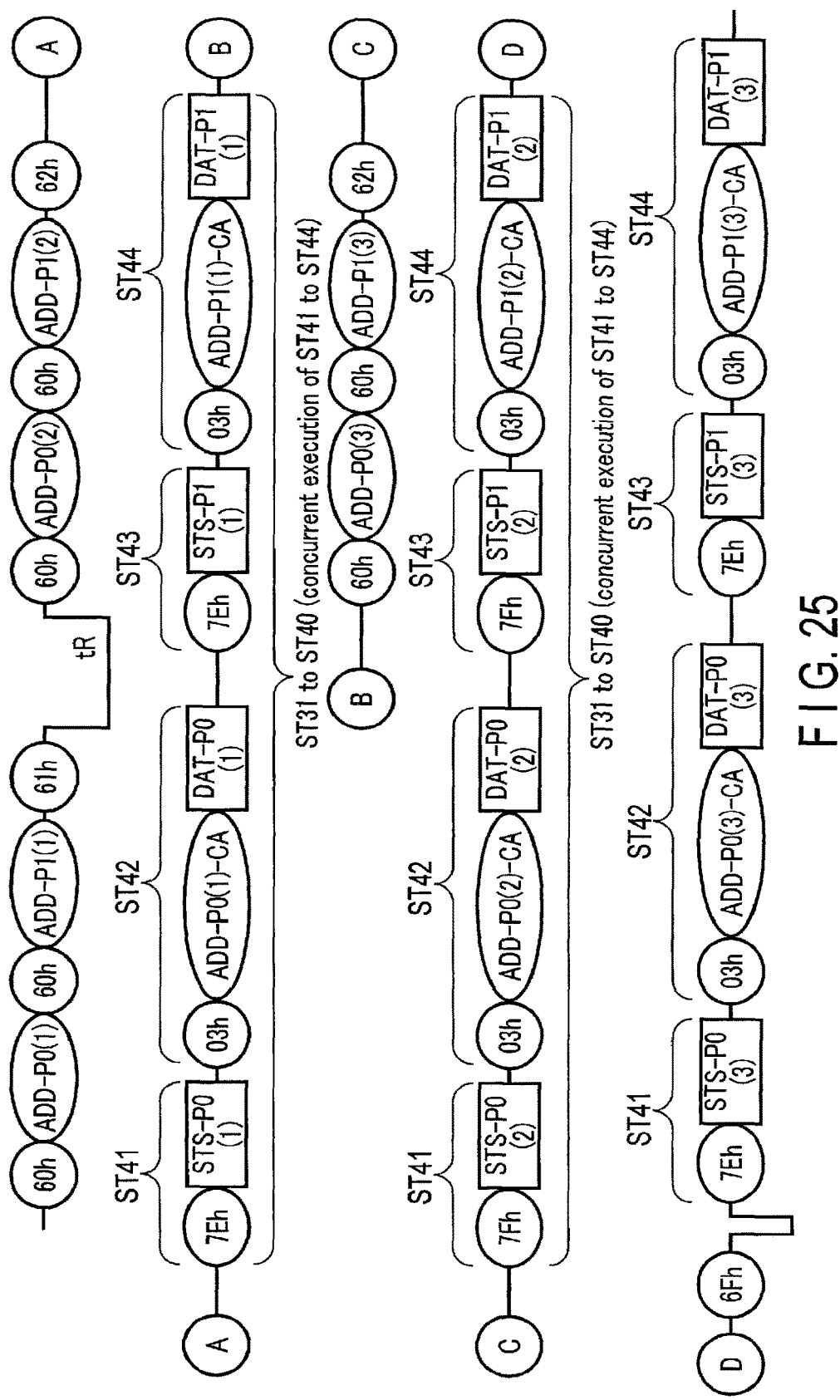
FIG. 25 is a command sequence for describing the multi-plane reading operation with data cache of the semiconductor storage device according to the second embodiment.

FIG. 25 is a command sequence for describing the multi-plane reading operation with data cache of the semiconductor storage device according to the second embodiment. FIG. 25 corresponds to FIG. 11, and shows an example of a command sequence for implementing the multi-plane reading operation with data cache shown in FIG. 10.

As shown in FIG. 25, the multi-plane reading operation with data cache according to the second embodiment differs from that according to the first embodiment in the portion associated with a reading operation from the memory cell array 21 and the portion associated with an output operation to the host device 1. On the other hand, the portion associated with an error correction result output operation according to the second embodiment is the same as that according to the first embodiment.

As shown in FIG. 25, the host device 1 transmits command "60h", address "ADD-P0 (1)", command "60h", address "ADD-P0 (1)", and command "61h" to the semiconductor storage device 3 in the order named. Upon receiving command "61h", the semiconductor storage device 3 sets OIP in the feature table to "1" during a period tR to notify the host device 1 of a busy state.

The operation of the semiconductor storage device 3 during the period tR is the same as that in the first embodiment, and a description of the operation will be omitted. Upon completing the concurrent reading of data from the memory cell arrays 21-0 and 21-1, the semiconductor storage device 3 sets OIP to "0" to notify the host device 1 of a ready state.

In this case, the state of the semiconductor storage device 3 coincides with the state immediately before step ST31 shown in FIG. 10.

Subsequently, the host device 1 transmits command "60h", address "ADD-P0 (2)", command "60h", address "ADD-P1 (2)", and command "62h" to the semiconductor storage device 3 in the order named. Command "62h" is a command for instructing to read data corresponding to the address transmitted immediately after the command from the memory cell array 21. That is, command "62h" instructs the semiconductor storage device 3 to concurrently read data from the memory cell arrays 21-0 and 21-1. In addition, command "62h" is a command for instructing to temporarily hold the data to be read next. Note that the data read at the second reading operation is held without overwriting the data read at the first reading operation.

Upon receiving command "62h", the semiconductor storage device 3 executes steps ST31 to ST40 shown in FIG. 10. That is, upon receiving command "62h", the semiconductor storage device 3 respectively transfers the data held in the registers C1, C2, D1, and D2 to the registers A1, A2, B1, and B2 to prepare for the outputting of the data.

The host device 1 and the semiconductor storage device 3 execute steps ST41 to ST44 shown in FIG. 10 concurrently with steps ST31 to ST40.

More specifically, the host device 1 transmits command "7Eh" to the semiconductor storage device 3. Upon receiving command "7Eh", the semiconductor storage device 3 outputs, to the host device 1, the error correction result STS-P0 (n), of the error correction results STS-P0 (n) held in the status register 15, which corresponds to the data read at the first reading operation.

Based on the error correction result STS-P0(1), the host device 1 confirms that the read data has normally undergone error correction. The host device 1 then transmits command "03h" and address "ADD-P0 (1)-CA" to the semiconductor storage device 3.

Upon receiving address "ADD-P0 (1)-CA", the semiconductor storage device 3 outputs the post-error correction data held in the register A2 as output data DAT-P0(1) to the host device 1.

The host device 1 also transmits again command "7Eh" to the semiconductor storage device 3. Upon receiving second command "7Eh", the semiconductor storage device 3 outputs, to the host device 1, the error correction result STS-P1(1), of the error correction results STS-P1 (n) held in the status register 15, which corresponds to the data read at the first reading operation.

Based on the error correction result STS-P1(1), the host device 1 confirms that the read data has normally undergone error correction. The host device 1 then transmits command "03h" and address "ADD-P1 (1)-CA" to the semiconductor storage device 3.

Upon receiving address "ADD-P1 (1)-CA", the semiconductor storage device 3 outputs the post-error correction data held in the register B2 as output data DAT-P1(1) to the host device 1.

In this case, the state of the semiconductor storage device 3 coincides again with the state immediately before step ST31 shown FIG. 10.

Subsequently, the host device 1 transmits command "60h", address "ADD-P0 (3)", command "60h", address "ADD-P1 (3)", and command "62h" to the semiconductor storage device 3 in the order named.

Upon receiving command "62h", the semiconductor storage device 3 executes steps ST31 to ST40 shown in FIG. 10. That is, upon receiving command "62h", the semiconductor storage device 3 transfers the data held in the registers C1, C2, D1, and D2 to the registers A1, A2, B1, and B2 to prepare for the outputting of the data.

The host device 1 and the semiconductor storage device 3 execute steps ST41 to ST44 shown in FIG. 10 concurrently with steps ST31 to ST40.

More specifically, the host device 1 transmits command "7Fh" to the semiconductor storage device 3. Upon receiving command "7Fh", the semiconductor storage device 3 outputs, to the host device 1, an error correction result STS-P0(2), of the error correction results STS-P0 (n) held in the status register 15, which corresponds to the data read at the second reading operation.

Based on the error correction result STS-P0(2), the host device 1 confirms that the read data has normally undergone error correction. The host device 1 then transmits command "03h" and address "ADD-P0 (2)-CA" to the semiconductor storage device 3.

Upon receiving address "ADD-P0 (2)-CA", the semiconductor storage device 3 outputs the post-error correction data held in the register B2 as read data DAT-P0(2) to the host device 1.

In addition, the host device 1 transmits command "7Fh" to the semiconductor storage device 3. Upon receiving second command "7Fh", the semiconductor storage device 3 outputs, to the host device 1, an error correction result STS-P1(2), of error correction results STS-P1 (n) held in the status register 15, which corresponds to the data read at the second reading operation.

Based on the error correction result STS-P1(2), the host device 1 confirms that the read data has normally undergone error correction. The host device 1 then transmits command "03h" and address "ADD-P1 (2)-CA" to the semiconductor storage device 3.

Upon receiving address "ADD-P1 (2)-CA", the semiconductor storage device 3 outputs the post-error correction data held in the register B2 as output data DAT-P1(2) to the host device 1.

Subsequently, the host device 1 transmits command "6Fh" to the semiconductor storage device 3. Upon receiving command "6Fh", the semiconductor storage device 3 transfers the data held in the registers C1, C2, D1, and D2 to the registers A1, A2, B1, and B2 to prepare for the outputting of the data.

The host device 1 transmits command "7Eh" to the semiconductor storage device 3. Upon receiving command "7Eh", the semiconductor storage device 3 outputs, to the host device 1, an error correction result STS-P0(3), of the error correction results STS-P0 (n) held in the status register 15, which corresponds to the data read at the third reading operation.

Based on the error correction result STS-P0(3), the host device 1 confirms that the read data has normally undergone error correction. The host device 1 then transmits command "03h" and address "ADD-P0 (3)-CA" to the semiconductor storage device 3.

Upon receiving address "ADD-P0 (3)-CA", the semiconductor storage device 3 outputs the post-error correction data held in the register A2 as output data DAT-P0(3) to the host device 1.

In addition, the host device 1 transmits again command "7Eh" to the semiconductor storage device 3. Upon receiving second command "7Eh", the semiconductor storage device 3 outputs, to the host device 1, an error correction result STS-P1(3), of the error correction results STS-P1 (n) held in the status register 15, which corresponds the data read at the third reading operation.

Based on the error correction result STS-P1(3), the host device 1 confirms that the read data has normally undergone error correction. The host device 1 then transmits command "03h" and address "ADD-P1 (3)-CA" to the semiconductor storage device 3.

Upon receiving address "ADD-P1 (3)-CA", the semiconductor storage device 3 outputs the post-error correction data held in the register B2 as read data DAT-P1(3) to the host device 1.

With the above operation, the semiconductor storage device 3 can individually output the error correction results STS corresponding to the respective data to the host device 1 even in the multi-plane reading operation with data cache based on a serial interface.

2.3 Effects of Embodiment

The semiconductor storage device according to the second embodiment receives the signals SCK, /CS, SI, /HOLD, and /WP, and outputs the signal SO. The sequencer 16 recognizes, as a command, the signal SI received immediately after the reception of the asserted signal /CS. This allows the semiconductor storage device 3 to output the error correction results STS in the same manner as in the first embodiment even when the semiconductor storage device 3 is connected to the host device 1 via a serial interface.

In addition, the sequencer 16 outputs the error correction result STS-P0 from the status register 15 upon receiving command "7Ah" from the host device 1, and outputs the error correction result STS-P1 from the status register 15 upon receiving command "7Bh". This allows the host device 1 to grasp how many error bits have occurred at which sector positions concerning the respective data concurrently read from the different planes PB0 and PB1 in a multi-plane reading operation. This allows the host device 1 to determine the necessity of a refresh operation even in a multi-plane reading operation.

In addition, the sequencer 16 outputs an error correction result STS-(odd) from the status register 15 upon receiving command "7Ch" from the host device 1, and outputs an error correction result STS-(even) from the status register 15 upon receiving command "7Dh". This allows the controller 1 to grasp how many error bits have occurred at which sector positions concerning the respective data for which reading from the memory cell array 21 by a cache reading operation and outputting of data to the controller 1 have been concurrently executed. This allows the controller 1 to determine the necessity of a refresh operation even in a cache reading operation.

In addition, the sequencer 16 outputs error correction results STS-P0 (odd) and STS-P1 (odd) from the status register 15 upon receiving command "7Eh" from the host device 1, and outputs error correction results STS-P0 (even) and STS-P1 (even) from the status register 15 upon receiving command "7Fh". This allows the controller 1 to grasp how many error bits have occurred at which sector positions concerning the respective data for which reading from the memory cell array 21 by a multi-plane reading operation with data cache and outputting of data to the controller 1 have been concurrently executed. This allows the controller 1 to determine the necessity of a refresh operation even in a multi-plane reading operation with data cache. Therefore, the same effects as those of the first embodiment can be obtained.

2.4 First Modification of Second Embodiment

Note that the second embodiment has exemplified the case of using command "7xh" dedicated to making the host device 1 output the error correction results STS. However, this is not exhaustive. The error correction results STS may be read from the feature table separately held in the status register 15. That is, the host device 1 may cause the semiconductor storage device to output the error correction results STS by using command "0Fh" in the feature table.

A description of the same portions as those in the second embodiment will be omitted, and only different portions will be described below.

2.4.1 Error Correction Information Reading Operation

An error correction result output operation will be described first. FIG. 26 is a command sequence for describing the error correction result output operation of the semiconductor storage device according to the first modification of the second embodiment. FIG. 26 corresponds to FIG. 22.

As shown in FIG. 26, the host device 1 asserts the signal /CS and issues command "0Fh" as the signal SI throughout an 8-clock cycle. The host device 1 further issues the signal SCK. In addition, the host device 1 transmits address "x0h" throughout, for example, an 8-clock cycle as the signal SI to the semiconductor storage device 3.

When command "0Fh" is stored in a command register 14, the sequencer 16 specifies that information in the feature table which corresponds to address "x0h". The specified information is transferred from the status register 15 to the input/output control circuit 11. Note that when address "x0h" corresponds to the error correction result STS on a given sector in a given page, the sequencer 16 sequentially outputs the error correction results STS on other sectors in the given page.

That is, when command "0Fh" and one address "x0h" are issued, the semiconductor storage device 3 sequentially outputs the error correction results STS, each corresponding to one sector throughout an 8-clock cycle, to the host device 1 in the order of sector 0 to sector 3. After the semiconductor storage device 3 outputs the error correction results STS corresponding to one page, the host device 1 negates the signal /CS.

Note that the error correction results STS in the feature table and addresses "x0h" assigned to the error correction results STS which are applied to the first modification of the second embodiment are similar to those applied to the first modification of the first embodiment, and hence a description of them will be omitted.

With the above operation, the semiconductor storage device 3 can output the error correction results STS similar to those in the second embodiment to the host device 1.

2.4.2 Multi-Plane Reading Operation

A multi-plane reading operation will be described next.

Figure 27:
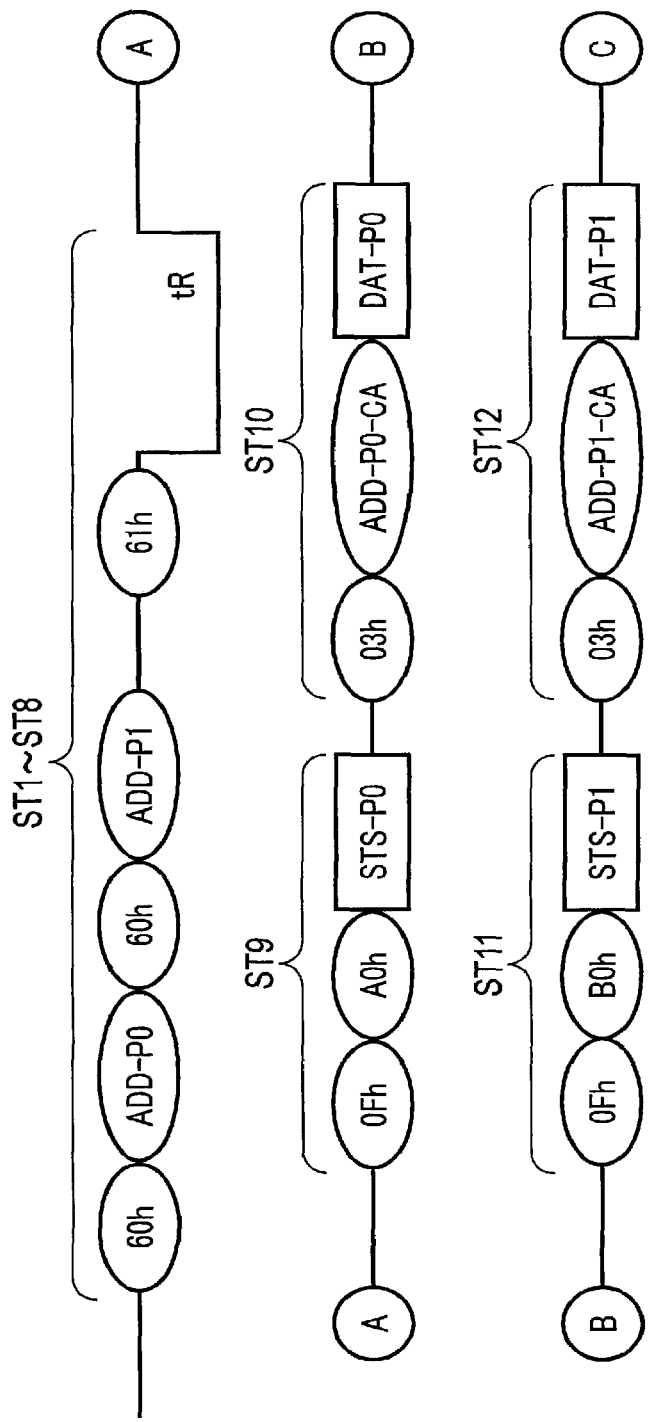
FIG. 27 is a command sequence for describing the multi-plane reading operation of the semiconductor storage device according to the first modification of the second embodiment.

FIG. 27 is a command sequence for describing the multi-plane reading operation of the semiconductor storage device according to the first modification of the second embodiment. FIG. 27 corresponds to FIG. 23 in the second embodiment.

As shown in FIG. 27, the multi-plane reading operation according to the first modification of the second embodiment differs from that according to the second embodiment only in that feature read command "0Fh" and address "x0h" are used in place of dedicated command "7xh".

In addition, a description of the differences between the first modification of the second embodiment and the second embodiment is the same as that of the differences between the first modification of the first embodiment and the first embodiment.

With the above operation, the semiconductor storage device can output the error correction results STS held in the feature table to the host device 1 in the multi-plane reading operation based on a serial interface.

2.4.3 Cache Reading Operation

A cache reading operation will be described next.

Figure 28:
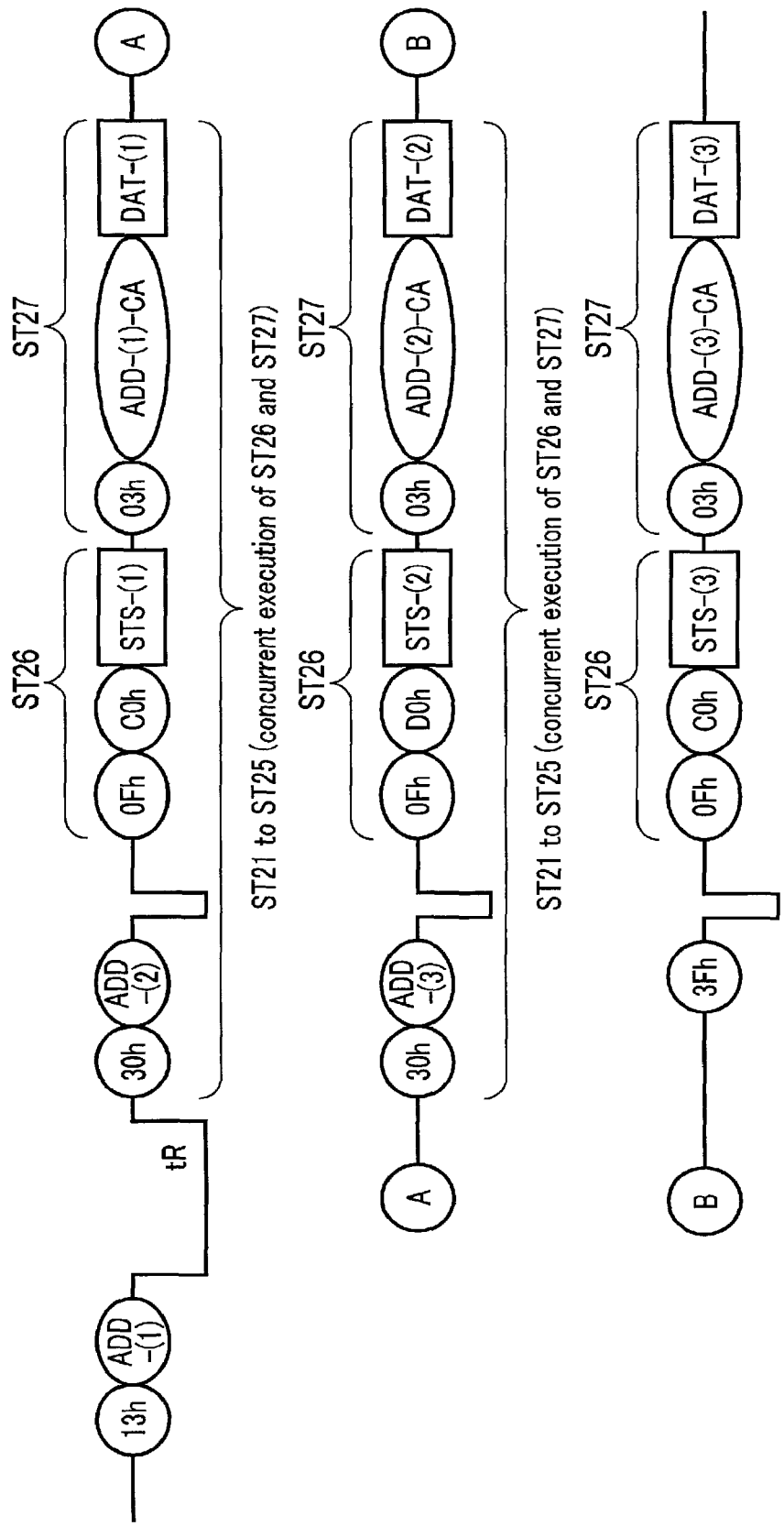
FIG. 28 is a command sequence for describing the cache reading operation of the semiconductor storage device according to the first modification of the second embodiment.

FIG. 28 is a command sequence for describing the cache reading operation of the semiconductor storage device according to the first modification of the second embodiment. FIG. 28 corresponds to FIG. 24 in the second embodiment.

As shown in FIG. 28, the cache reading operation according to the first modification of the second embodiment differs from that according to the second embodiment only in that feature read command "0Fh" and address "x0h" are used in place of dedicated command "7xh".

In addition, a description of the differences between the first modification of the second embodiment and the second embodiment is the same as that of the differences between the first modification of the first embodiment and the first embodiment.

With the above operation, the semiconductor storage device can output the error correction results STS held in the feature table to the host device 1 in the cache reading operation based on a serial interface.

2.4.4 Multi-Plane Reading Operation with Data Cache

A multi-plane reading operation with data cache will be described next.

Figure 29:
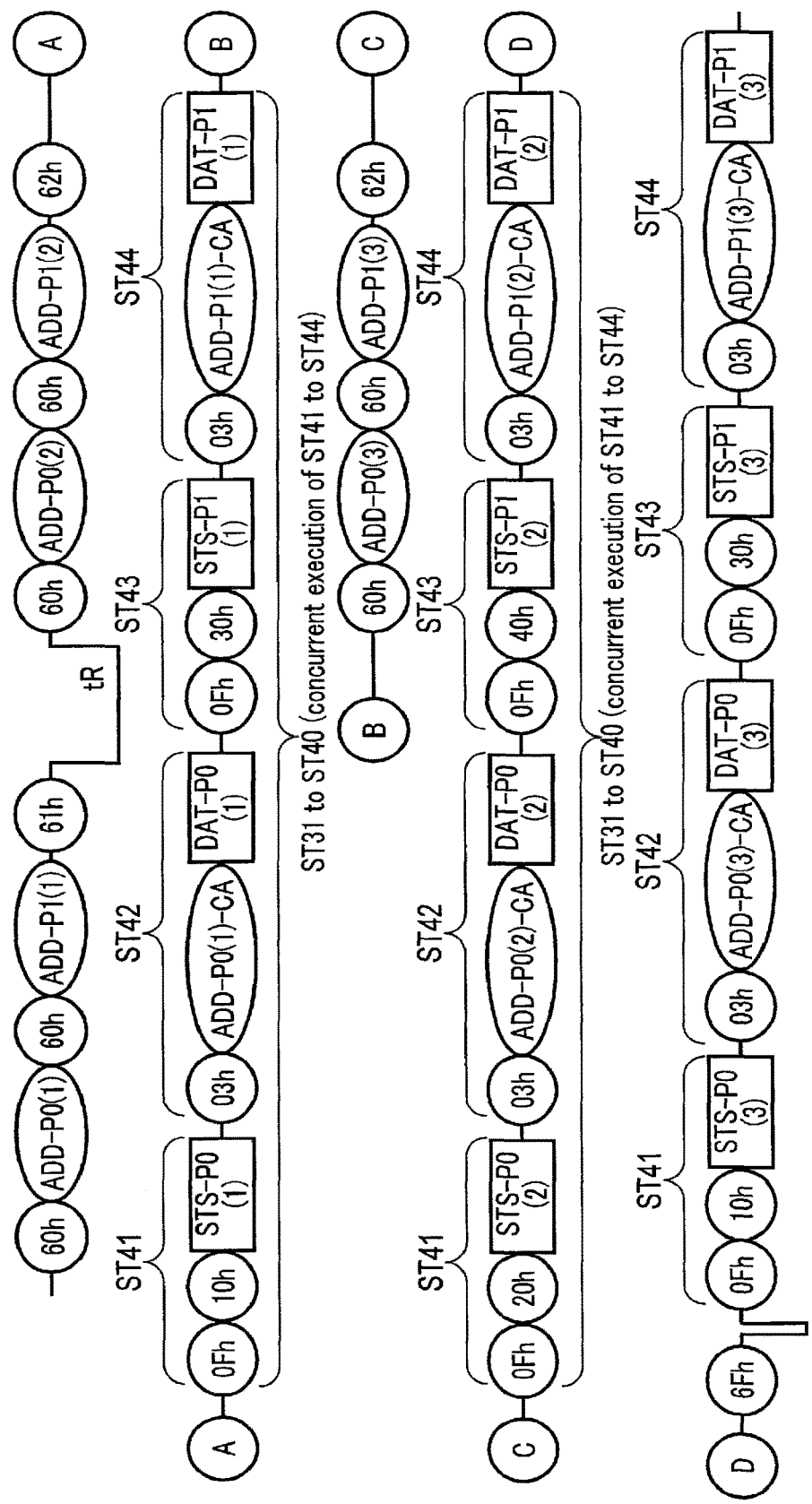
FIG. 29 is a command sequence for describing multi-plane reading operation with data cache of the semiconductor storage device according to the first modification of the second embodiment.

FIG. 29 is a command sequence for describing the multi-plane reading operation with data cache of the semiconductor storage device according to the first modification of the second embodiment. FIG. 29 corresponds to FIG. 25 in the second embodiment.

As shown in FIG. 29, the multi-plane reading operation with data cache according to the first modification of the second embodiment differs from that according to the second embodiment only in that feature read command "0Fh" and address "x0h" are used in place of dedicated command "7xh".

In addition, a description of the differences between the first modification of the second embodiment and the second embodiment is the same as that of the differences between the first modification of the first embodiment and the first embodiment.

With the above operation, the semiconductor storage device can output the error correction results STS held in the feature table to the host device 1 in the multi-plane reading operation with data cache based on a serial interface.

2.4.5 Effects of First Modification

According to the first modification of the second embodiment, the status register 15 holds the error correction results STS in the feature table. The semiconductor storage device 3 outputs the error correction results STS in the feature table to obtain the same effects as those of the second embodiment.

More specifically, upon receiving feature table output command "0Fh" and address "x0h", the sequencer 16 consecutively outputs the error correction result STS on a sector corresponding to address "x0h". This allows the host device 1 to obtain the error correction results STS corresponding to one page every time issuing command "0Fh".

In addition, addresses "x0h" are assigned in the same manner as in the first modification of the first embodiment. That is, in a multi-plane reading operation, addresses "A0h" and "B0h" are respectively assigned to the error correction results STS-P0 and STS-P1. In a cache reading operation, addresses "C0h" and "D0h" are respectively assigned to the error correction results STS-(odd) and STS-(even). In a multi-plane reading operation with data cache, addresses "10h", "20h", "30h", and "40h" are respectively assigned to the error correction results STS-P0 (odd), STS-P0 (even), STS-P1 (odd), and STS-P1 (even). This makes it possible to determine the necessity of a refresh operation in each of a multi-plane reading operation, cache reading operation, and multi-plane reading operation with data cache without using any dedicated commands for outputting the error correction results STS.

2.5 Second Modification of Second Embodiment

The first modification of the second embodiment has exemplified the case in which when the host device 1 issues one address "x0h", the error correction results STS corresponding to one page are automatically output throughout four cycles. However, this is not exhaustive, and the error correction result STS corresponding to one sector may be output with respect to one address "x0h".

Figure 30:
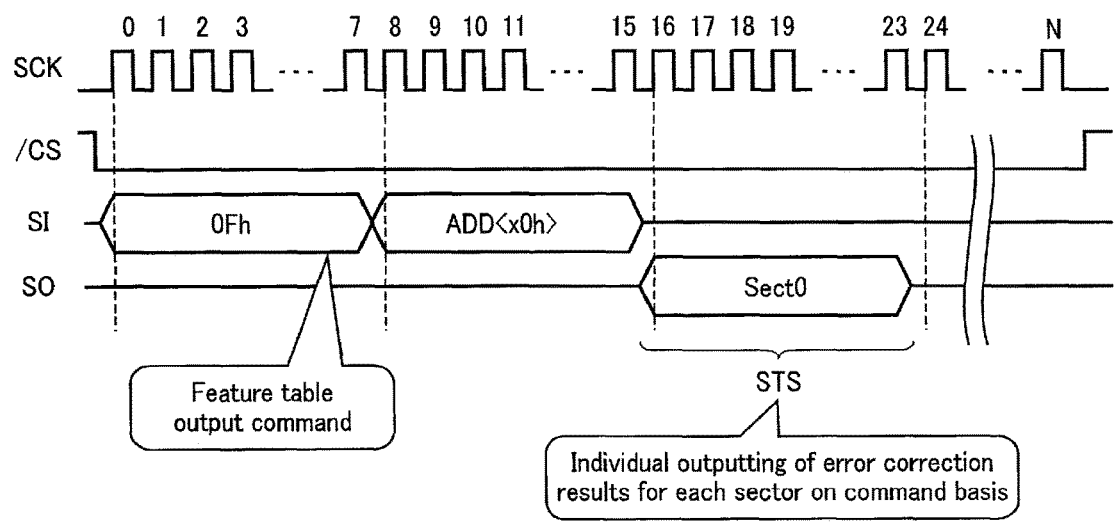
FIG. 30 is a command sequence for describing the error correction result output operation of the semiconductor storage device according to a second modification of the second embodiment.

FIG. 30 is a command sequence for describing the error correction result output operation of the semiconductor storage device according to the second modification of the second embodiment. FIG. 30 corresponds to part of FIG. 26.

As shown in FIG. 30, the host device 1 asserts the signal /CS and issues, for example, command "0Fh" as the signal SI throughout an 8-clock cycle. The host device 1 further issues the signal SCK. In addition, the host device 1 transmits address "x0h" throughout, for example, an 8-clock cycle to the semiconductor storage device 3.

When command "0Fh" is stored in the command register 14, the sequencer 16 specifies that information in the feature table which corresponds to address "x0h". The specified information is transferred from the status register 15 to the input/output control circuit 11. Note that when address "x0h" corresponds to the error correction result STS on a given sector in a given page, the sequencer 16 causes the semiconductor storage device to output only the error correction result STS on the given sector.

That is, when command "0Fh" and address "x0h" are issued, the semiconductor storage device 3 individually outputs, for example, only the error correction result STS on 1-sector data throughout an 8-clock cycle. After the semiconductor storage device 3 outputs the error correction result STS corresponding to one sector, the host device 1 negates the signal /CS.

With the above operation, the semiconductor storage device 3 can output the error correction results STS similar to those in the second embodiment to the host device 1.

When the error correction results STS are output in the above manner, address "x0h" is assigned for each sector. This makes it possible to specify all the sectors in all read data, when performing a multi-plane reading operation, cache reading operation, or multi-plane reading operation with data cache, by, for example, assigning corresponding addresses to the feature table shown in FIG. 20, as in the second modification of the first embodiment.

3. Others

Each embodiment described above has exemplified the case in which the ECC circuit 18 generates, as the error correction result STS, information including the sector position information of a sector in a given paper, error bit count information for each sector, and success/failure information. However, this is not exhaustive. For example, the ECC circuit 18 may generate, as the error correction result STS, information including a combination of the sector position information of a sector, among the sectors in a given page, which includes the largest number of error bits, and error bit count information in the sector. In addition, for example, the ECC circuit 18 may generate, as the error correction result STS, information including a combination of the sector position information of a sector in a given page and information indicating whether the number of errors obtained as a result of error detection processing with respect to the sector exceeds a given threshold. Note that the given threshold may be a preset fixed value or the controller or host device 1 may be configured to properly set a different value.

In addition, when the error correction result STS includes information other than sector position information and error bit count information, areas in which such other information is defined may be assigned in a feature table.

The semiconductor storage devices 2 and 3 may be configured to output the error correction results STS including the above types of information generated by the ECC circuit 18 in accordance with the command sequence described in each of the above embodiments.

In addition, each embodiment described above has exemplified the case in which a cache reading operation, multi-plane reading operation with data cache, and random cache reading operation are executed. For example, in a cache reading operation and a multi-plane reading operation with data cache, a sequential cache reading operation may be executed, in which consecutive pages are sequentially read.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the invention.

Note that some or all of the above embodiments can be described as in the following supplementary notes but are not limited to the following.

[Supplementary Note 1]

A semiconductor storage device includes an interface circuit configured to communicate with an outside, a first memory cell array and a second memory cell array, each of which includes a memory cell transistor configured to hold data and from each of which data is read for each page unit, and an error detection circuit configured to detect an error in data read from each of the first memory cell array and the second memory cell array, wherein the read data of a size corresponding to the page unit is subjected to detection of an error for each of a plurality of first units into which the page unit is divided, and when performing a first operation of outputting first data and second data concurrently read from the first memory cell array and the second memory cell array, the interface circuit is configured to output information based on the error detected with respect to the first data and the second data to the outside.

[Supplementary Note 2]

In the semiconductor storage device described in Supplementary Note 1, the interface circuit is configured to output, to the outside, the information concerning each of the first data and the second data in a third operation of concurrently executing reading of third data from the first memory cell array and reading of fourth data from the second memory cell array, which are executed concurrently with outputting of the first data and the second data to the outside.

What is claimed is:

1. A NAND flash memory device comprising:
an interface circuit configured to communicate with an outside;
a first memory cell array and a second memory cell array, each of which includes a memory cell transistor configured to store data and from each of which data is read for each page unit;
a first register configured to store data read from the first memory cell array;
a second register configured to store data read from the second memory cell array; and
a detection circuit configured to detect an error in data read from the first memory cell array and the second memory cell array,
wherein the read data of a size corresponding to the page unit is subjected to detection of an error for each of a plurality of first units into which the page unit is divided, and
when performing an operation of outputting the read data, the interface circuit is configured to output information based on the error detected in the read data output during the operation, the operation including at least one of a first operation, a second operation, and a third operation, the first operation concurrently executing:
  outputting first data stored in the first register to the outside; and
  reading second data different from the first data from the first memory cell array and storing the second data in the first register;
the second operation concurrently executing:
  outputting the first data stored in the first register to the outside; and
  outputting third data stored in the second register to the outside; and
the third operation concurrently executing:
  outputting the first data stored in the first register to the outside;
  reading the second data from the first memory cell array and storing the second data in the first register;
  outputting the third data stored in the second register to the outside; and
  reading fourth data different from the third data from the second memory cell array and storing the fourth data in the second register.

2. The device of claim 1, wherein the information includes one of an error bit count detected for each of the first units and a value indicating whether the error bit count detected for each of the first units exceeds a given threshold and a maximum value of the error bit count detected for each of the first units.

3. The device of claim 2, wherein the threshold is configured to be set from the outside.

4. The device of claim 2, wherein the threshold includes a fixed value.

5. The device of claim 2, wherein
when performing the first operation, the interface circuit is configured to output the information concerning the first data to the outside upon receiving a first command in the first operation, and output the information concerning the second data to the outside upon receiving a second command after the first operation,
when performing the second operation, the interface circuit is configured to output the information concerning the first data and the third data to the outside upon receiving a first command in the second operation, and
when performing the third operation, the interface circuit is configured to output the information concerning the first data and the third data to the outside upon receiving a first command in the third operation, and output the information concerning the second data and the fourth data to the outside upon receiving a second command after the third operation.

6. The device of claim 2, further comprising a table configured to store the information,
wherein the interface circuit is configured to output the information from the table.

7. The device of claim 6, wherein the interface circuit is configured to consecutively output the information for each of the first units from the table upon receiving a first command in the operation.

8. The device of claim 6, wherein the interface circuit is configured to output, from the table, the error bit count of a portion of the information which corresponds to the first unit, upon receiving a first command in the first operation.

9. The device of claim 1, wherein the interface circuit is configured to recognize as a command, an input signal which is different from an asserted chip select signal and is received immediately after reception of the chip select signal.

10. The device of claim 1, wherein the interface circuit is configured to recognize, as a command, an input signal received during reception of an asserted command latch enable signal.

* * * * *